(12) United States Patent
Yamazaki et al.

(10) Patent No.: US 6,690,437 B2
(45) Date of Patent: Feb. 10, 2004

(54) ELECTRO-OPTICAL DEVICE

(75) Inventors: Shunpei Yamazaki, Tokyo (JP); Yuugo Goto, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 09/835,693

(22) Filed: Apr. 16, 2001

(65) Prior Publication Data

US 2001/0040655 A1 Nov. 15, 2001

(30) Foreign Application Priority Data

Apr. 18, 2000 (JP) ........................................ 2000-115993

(51) Int. Cl.⁷ ............................................. G02F 1/1335
(52) U.S. Cl. ........................................ 349/110; 349/106
(58) Field of Search ................................. 349/104, 106, 349/110, 113, 115

(56) References Cited

U.S. PATENT DOCUMENTS 4,470,667 A    9/1984   Okubo et al.
5,680,187 A   10/1997   Nagayama et al.
5,757,451 A    5/1998   Miyazaki et al.

FOREIGN PATENT DOCUMENTS

JP         402287303      * 11/1990
JP          10073813      *  3/1998

* cited by examiner

*Primary Examiner*—James Dudek
*Assistant Examiner*—Hoan Nguyen
(74) *Attorney, Agent, or Firm*—Cook, Alex, McFarron, Manzo, Cummings & Mehler, Ltd.

(57) ABSTRACT

In a conventional liquid crystal display panel using a metallic film as a light shielding mask of a color filter, there arose a problem in that a parasitic capacitor with the other wiring is generated to often cause a delay in signal. Further, there arose a problem in that, if an organic film containing a black pigment is used as the light shielding film of the color filter, the manufacturing step thereof increases. In the present invention, lamination films of colored layers consisting of two layers (lamination film of a red-colored layer and a blue-colored layer, or lamination film of a red-colored layer and a green-colored layer) are formed on an opposing substrate as light shielding portions so as to overlap with TFTs on a device substrate without forming a light-shielding mask (black matrix).

46 Claims, 27 Drawing Sheets

REFLECTION RATIO OF LAMINATION OF 2 LAYERS (Ref: Al-Ti)

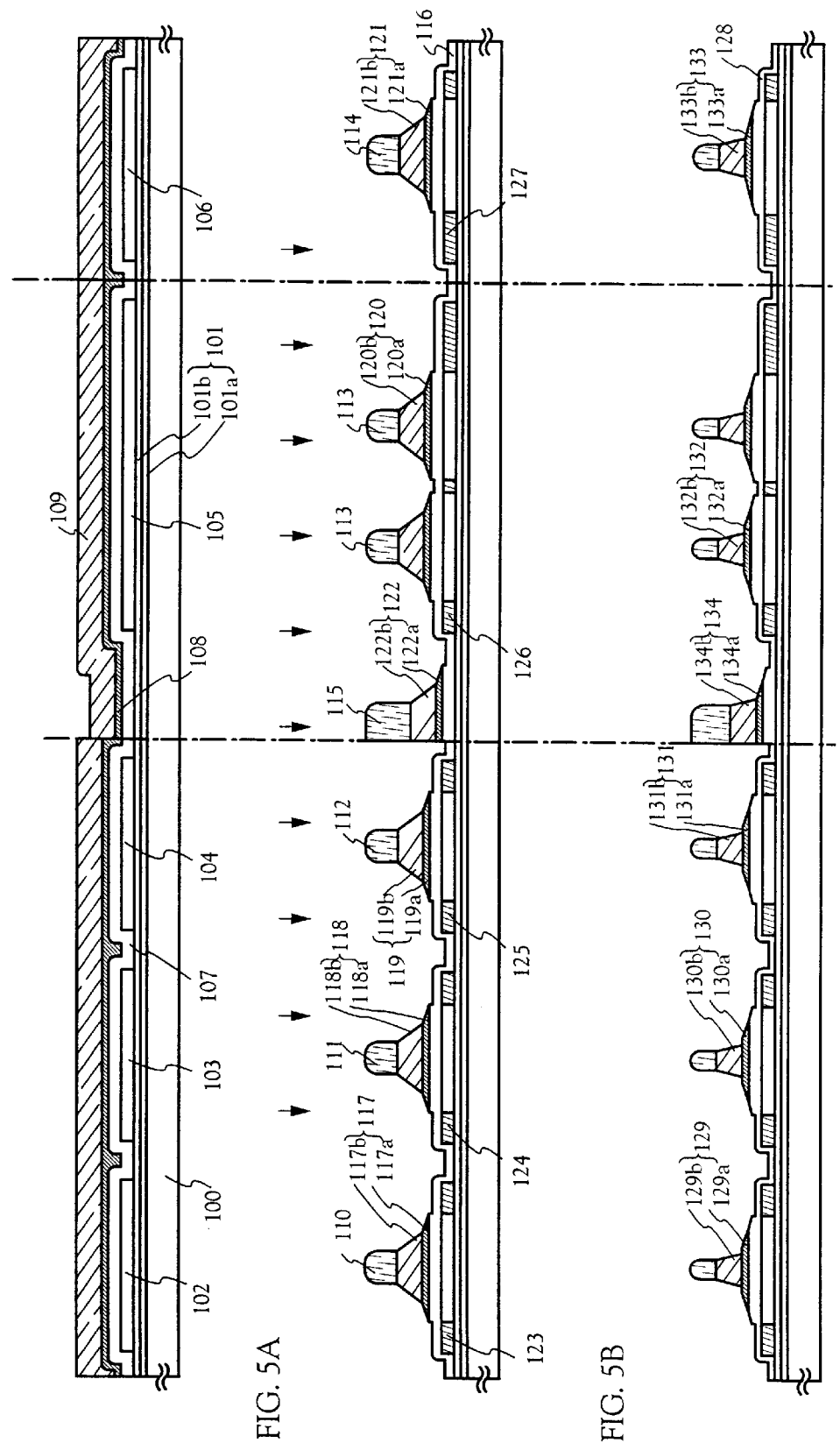

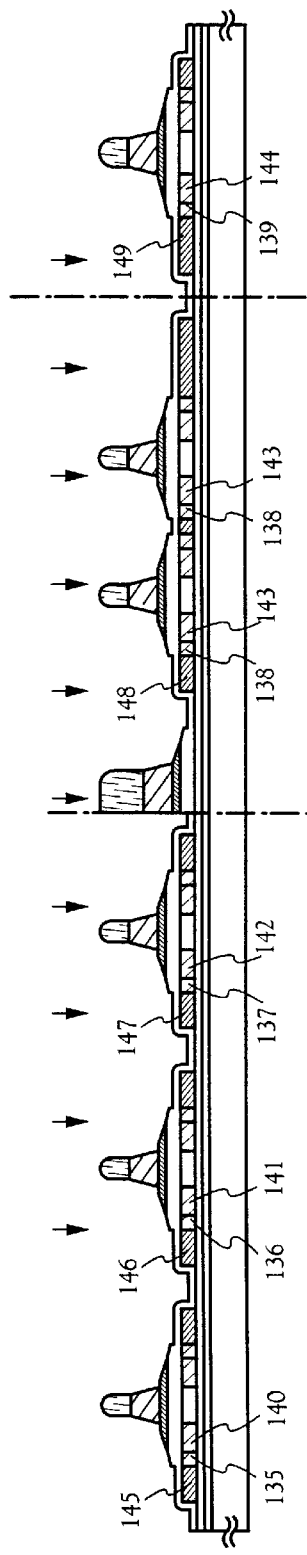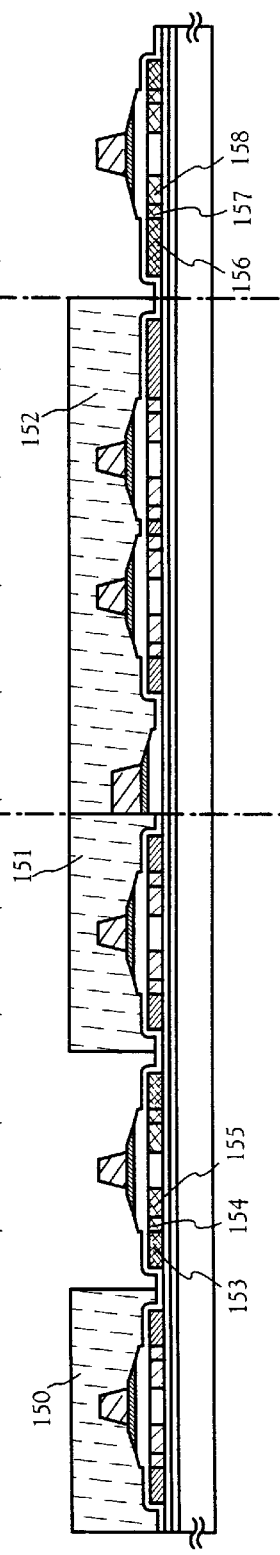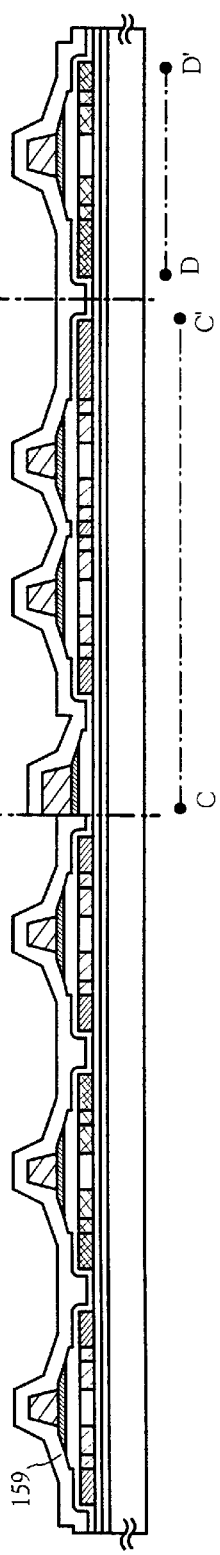
FIG. 6A
FIG. 6B
FIG. 6C

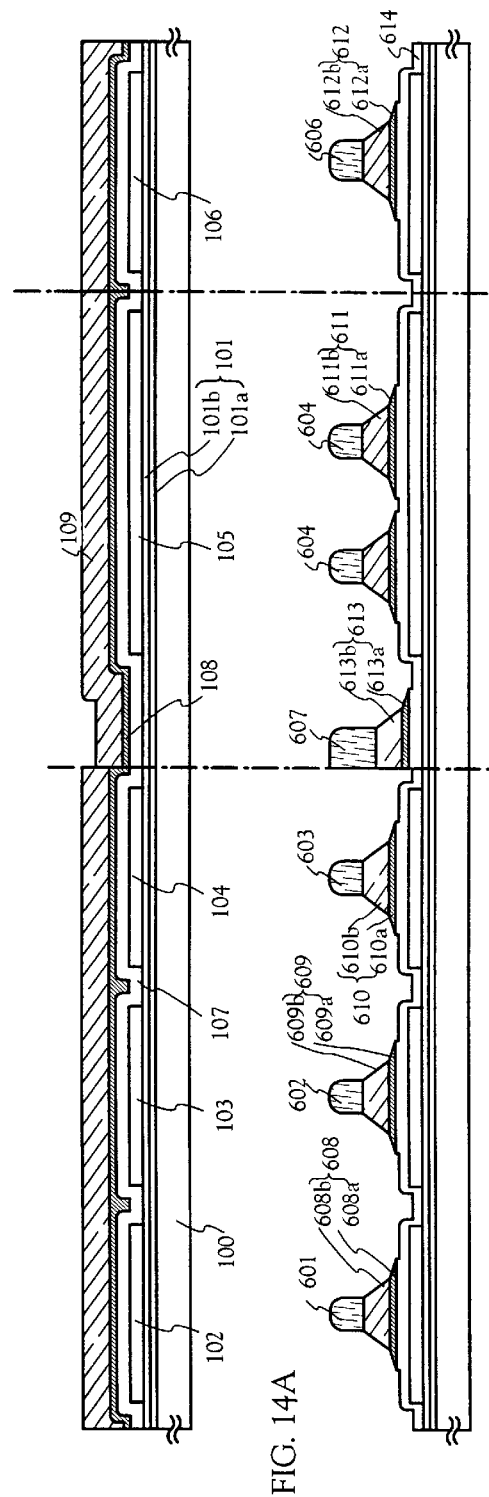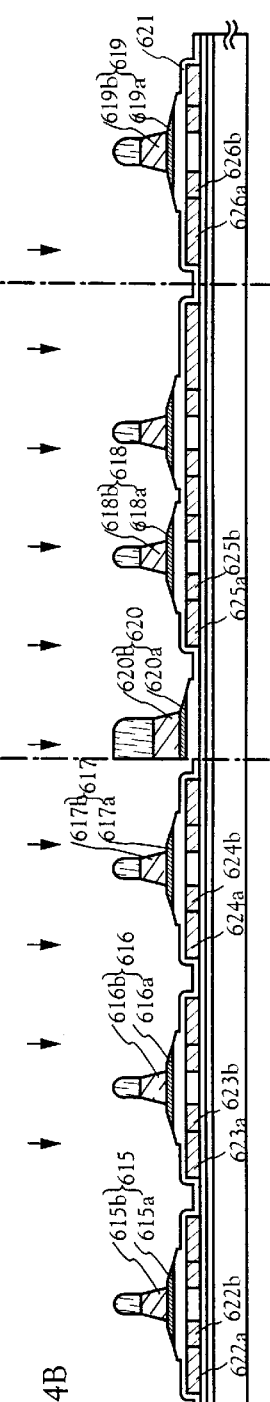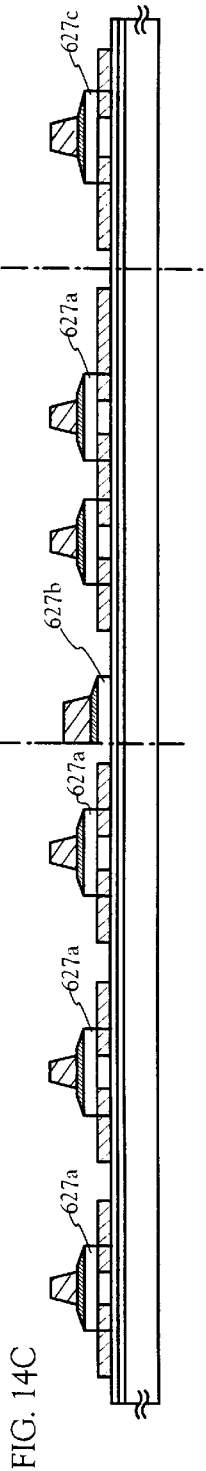
FIG. 14A
FIG. 14B
FIG. 14C
FIG. 14D

REFLECTION RATIO OF SINGLE LAYER (Ref: Al-Ti)

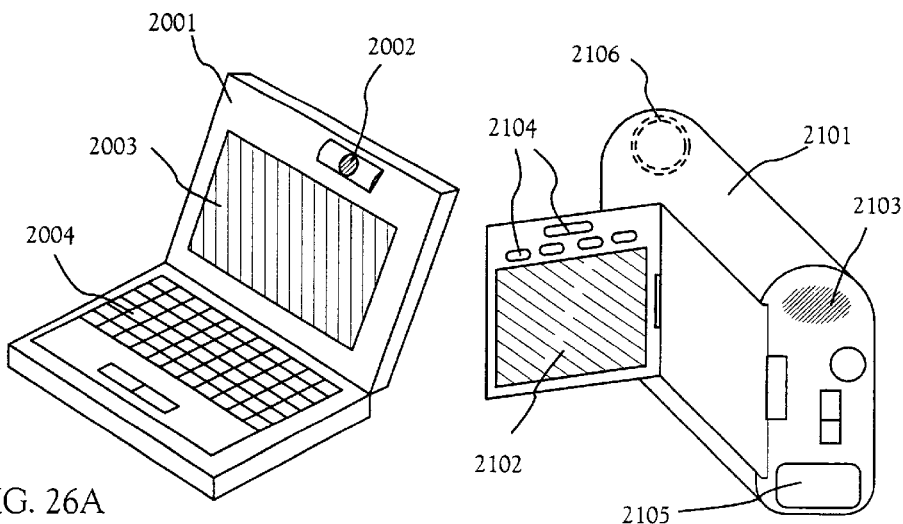
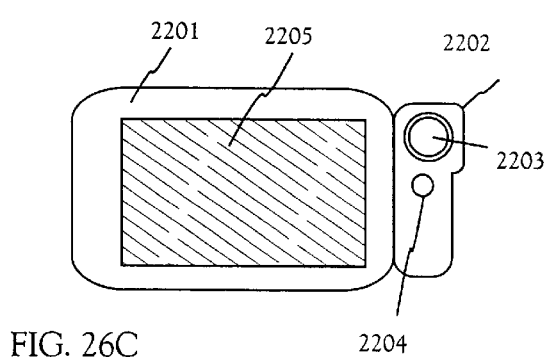
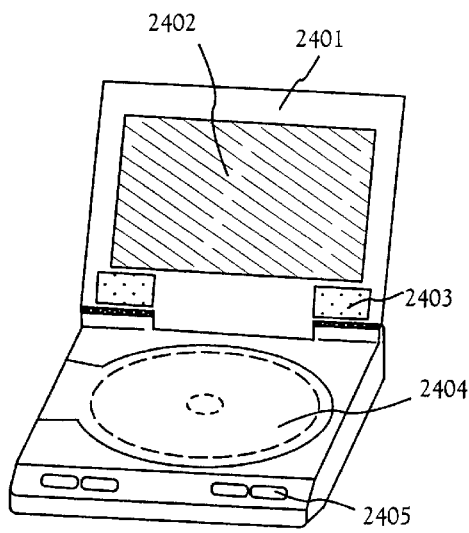
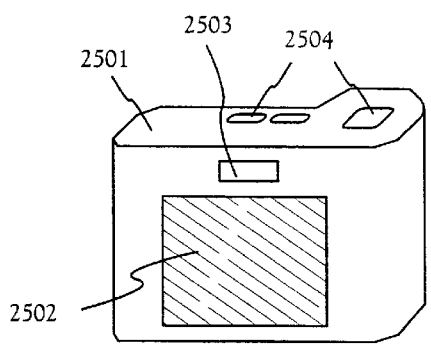
FIG. 26A
FIG. 26B
FIG. 26C
FIG. 26D
FIG. 26E
FIG. 26F

ELECTRO-OPTICAL DEVICE

BACKGROUND OF THE INVENTION

1. Field of the Invention

The present invention relates to a semiconductor device having a circuit constructed of a thin film transistor (hereinafter referred to as TFT), and to a method of manufacturing the same. For example, the present invention relates to an electro-optical device, which is represented by a liquid crystal display device, and to electronic equipment loaded with the electro-optical device (electric device) as a part.

Note that, in this specification, the term semiconductor device indicates general devices that function by utilizing semiconductor characteristics, and that electro-optical devices, semiconductor devices, and semiconductor circuits are all included in the category of the semiconductor device.

2. Description of the Related Art

In recent year, a technique for constructing a thin film transistor (hereinafter referred to as TFT) using a semiconductor thin film (on the order of several to several hundreds nm in thickness) formed on the substrate having an insulating surface is attracting an attention. The TFTs are widely used for electronic devices such as an IC or an electro-optical device, and the development of a switching element for a liquid crystal display device is particularly urgent.

In the liquid crystal devices, an attention is paid on an active matrix liquid crystal display device in which, to obtain an image with high quality, pixel electrodes are arranged in matrix and the TFT is used as a switching element for connecting the respective pixel electrodes.

The active matrix liquid crystal display devices are roughly classified into two types. There are known a transmission type and a reflection type active matrix liquid crystal display devices.

In particular, the reflection type liquid crystal display device does not use a back light, thereby having a merit in that a power consumption is small, as compared with the transmission type liquid crystal display device. Therefore, there is a great demand as a direct vision type display for a mobile computer or a video camera.

Note that the reflection type liquid crystal display device has a mechanism of displaying an image using an optical modulation action of the liquid crystal, in which a selection is made from a state where an incident light is reflected on a pixel electrode to be outputted outside the device or a state where the incident light is not outputted outside the device, and the display of bright and dark is performed, and further those are combined. The pixel electrode of the reflection type liquid crystal display device is generally made from a metallic material having high reflectivity, such as aluminum, and is electrically connected to a switching element such as a thin film transistor.

Further, in the liquid crystal display device, TFTs having semiconductors made of amorphous silicon or poly silicon, are arranged in matrix, and a liquid crystal material is sandwiched between a device electrode on which a pixel electrode connected to each TFT, a source wiring and a gate wiring each are formed and an opposing substrate having an opposing electrode arranged oppositely thereto. Besides, a color filter for displaying colors is stuck on the opposing substrate, and polarization plates are arranged on the device substrate and the opposing substrate, respectively, as optical shutters, to perform the color display.

These color filters have colored layers consisting of R (red), G (green), and B (blue), a light shielding mask for covering only gaps between pixels, and extracting a red color, a green color and a blue color by transmitting light therethrough. Further, the light shielding mask is generally constructed of an organic film containing a metallic film (chromium etc.) or a black pigment. These color filters are arranged at positions corresponding to the pixel, thereby being capable of changing the color to be extracted for each pixel. Note that the position corresponding to the pixel means the position that accords with the pixel electrode.

In the conventional liquid crystal display device in which a metallic film is used as the light shielding mask of the color filter, there arose a problem in that a parasitic capacitor is generated with the other wiring to easily cause a delay in signal. Besides, in the case an organic film containing a black pigment is used as the light shielding mask of the color filter, there arose a problem in the number of manufacturing steps increases.

SUMMARY OF THE INVENTION

An object of the present invention is to provide a pixel structure capable of shielding between TFT and pixel from light without using a light shielding mask (black matrix). The present invention has a feature in that, as one of means for shielding light, a lamination film consisting of two colored layers (lamination film consisting of a red-colored layer and a blue-colored layer or a lamination film consisting of a red-colored layer and a green-colored layer) is formed on an opposing substrate as a light shielding portion so as to overlap with a TFT formed on a device electrode.

In this specification, a "red-colored layer" is a layer which absorbs a part of light irradiated onto a colored layer to extract a red color therefrom. Further, similarly, a "blue-colored layer" is a layer which absorbs a part of light irradiated onto a colored layer to extract a blue color therefrom, and a "green color" is a layer which absorbs a part of light irradiated onto a colored layer to extract a green color therefrom.

The structure of the present invention disclosed in this specification relates to an electro-optical device, characterized by comprising: a first light shielding portion including a lamination of a first colored layer and a second colored layer; and a second light shielding portion including a lamination of the first colored layer and a third colored layer.

The structure of the present invention disclosed in this specification relates to an electro-optical device, characterized by comprising: at least a thin film transistor; a first light shielding portion including a lamination of a first colored layer and a second colored layer; and a second light shielding portion including a lamination of the first colored layer and a third colored layer, wherein the first and second light shielding portions overlap at least a channel region of the thin film transistor.

Further, another structure of the present invention relates to an electro-optical device, characterized in that: the device comprises: a plurality of pixel electrodes; a first light shielding portion including a lamination of a first colored layer and a second colored layer; and a second light shielding portion including a lamination of the first colored layer and a third colored layer, and that: the first light shielding portion and the second light shielding portion are formed between an arbitrary number of the pixel electrodes and the adjacent pixel electrodes, while overlapping with each other.

Still further, in the above-mentioned respective structures, the device is characterized in that an amount of reflection light of the first light shielding portion and an amount of reflection light of the second light shielding portion are different from each other.

Yet further, in the above-mentioned respective structures, the device is characterized in that the first colored layer is a red color. Also, the second colored layer is a blue color. Further, the third colored layer is a green color.

Moreover, in the above-mentioned respective structures, the device is characterized in that the third colored layer has a stripe shape.

Furthermore, in the above-mentioned respective structures, the device is characterized in that the first light shielding portion and the second light shielding portion are formed on an opposing substrate.

In addition, in the above-mentioned respective structures, the device is characterized in that the electro-optical device is a reflection type liquid crystal display device in which the pixel electrode is a film containing as a main component Al or Ag, or a lamination film thereof.

BRIEF DESCRIPTION OF THE DRAWINGS

FIGS. 1A to 1C show an arrangement of colored layers, in which FIG. 1A is a top view and FIGS. 1B and 1C are cross-sectional views thereof of the present invention;

FIGS. 5A to 5C show a manufacturing process of AM-LCD of Embodiment 3;

FIGS. 6A to 6C show a manufacturing process of AM-LCD of Embodiment 3;

FIGS. 14A to 14D show a manufacturing process of the AM-LCD of Embodiment 6;

FIGS. 26A to 26F show examples of electronic apparatus of Embodiment 11; and

DETAILED DESCRIPTION OF THE PREFERRED EMBODIMENTS

Embodiment Mode

Embodiment mode of the present invention will be described hereinbelow.

Figure 1A:
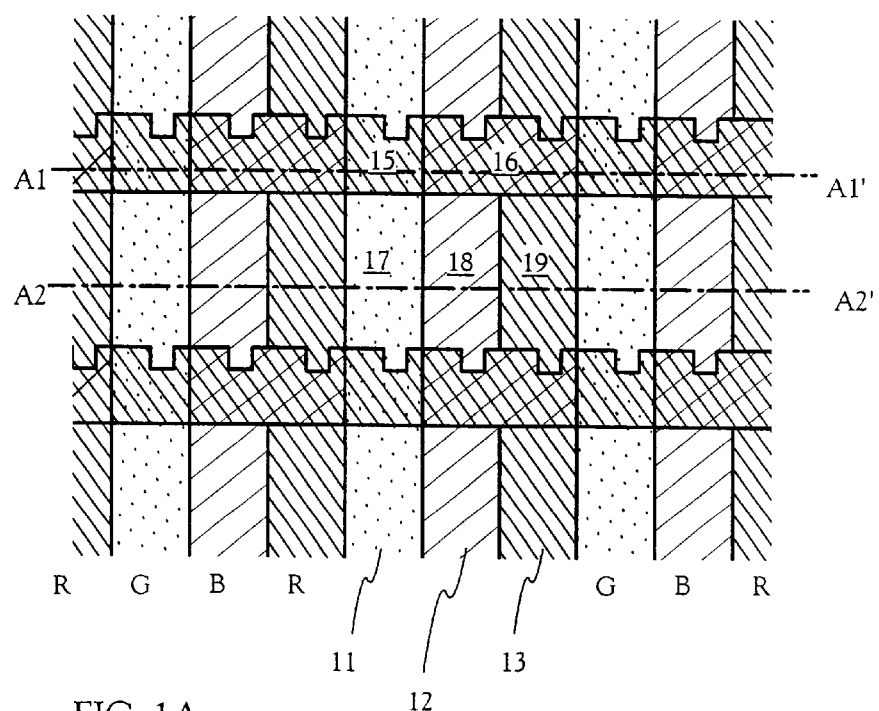
Figure 1B:
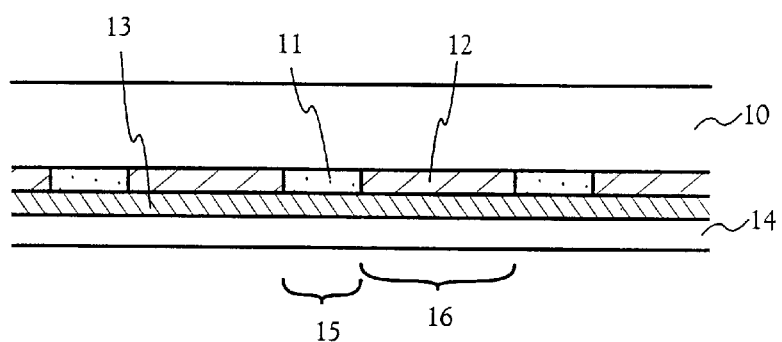
Figure 1C:
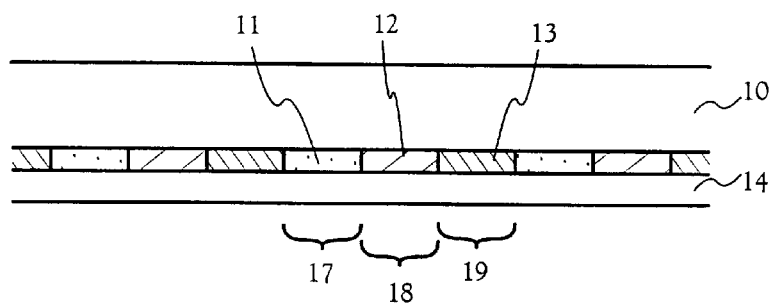

FIGS. 1A–1C show a structure of this invention. A reflection type liquid display device is explained as a sample.

FIG. 1A shows an example in which three colors-colored layers 11 to 13 are appropriately formed to form a first light shielding portion 15, a second light shielding portion 16, and pixel openings 17 to 19. The colored layer is generally formed using a color resist made from an organic photosensitive material in which pigment is dispersed.

The first light shielding portion 15 and the second light shielding portion 16 are formed so as to shield the gaps between the respective pixels from light. Therefore, an incident light is absorbed by the first light shielding portion 15 and the second light shielding portion 16, and is recognized by a observer as a substantial black color. Also, the first light shielding portion 15 and the second light shielding portion 16 are formed so as to overlap with a pixel TFT (not shown here) of the device electrode, and play a role for protecting the pixel TFT from outside light.

The first light shielding portion 15 is formed by laminating the green-colored layer 11 and the red-colored layer 13. The red-colored layer 13 is patterned into a lattice. Note that the green-colored layer 11 is patterned into a conventional shape (stripe like shape).

Further, the second light shielding portion 16 is formed by laminating the blue-colored layer 12 and the red-colored layer 13. Note that the blue-colored layer 12 is patterned into a shape so as to partially overlap with the adjacent red-colored layers 13.

Note that, FIG. 1B shows a sectional structure of the first light shielding portion and the second light shielding portion in FIG. 1A taken along the dash line (A1–A1'). As shown in FIG. 1B, the colored layer 13 is laminated over the colored layers 11 and 12 formed on the opposing substrate 10, and further the colored layer 13 is covered by a leveling film 14.

Besides, as to a lamination film (first light shielding portion 15) of the green-colored layer 11 and the red-colored layer 13, a lamination film (second light shielding portion 16) of the blue-colored layer 12 and the red-colored layer 13, a lamination film of the green-colored layer and the blue-colored layer, the respective reflection ratios are measured under a given measurement condition (white light source (D65), reflection electrode (Al), view field angle 2°, objective lens 5 times). The measurement results are shown in Table 1.

Table 1

Figure 3:
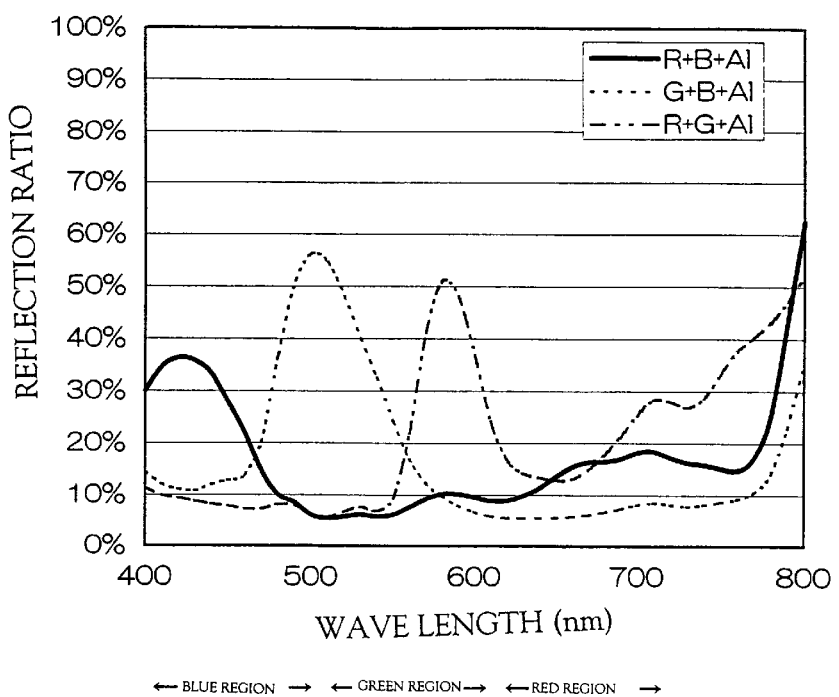
FIG. 3 is a graph showing a reflectiveness of a laminated colored layer of the present invention.

Further, FIG. 3 is a graph representing Table 1.

As shown in Table 1 and FIG. 3, R+B+A1 (corresponds to the second light shielding portion 16) becomes about 35% of reflection ratio in a 400 to 450 nm wavelength region, which is sufficient for functioning as a light shielding mask. Further, although R+G+A1 (corresponds to the first light shielding portion 15) becomes about 50% of reflection ratio at a vicinity of 570 nm wavelength region, which sufficiently functions as a light shielding mask.

Figure 24:
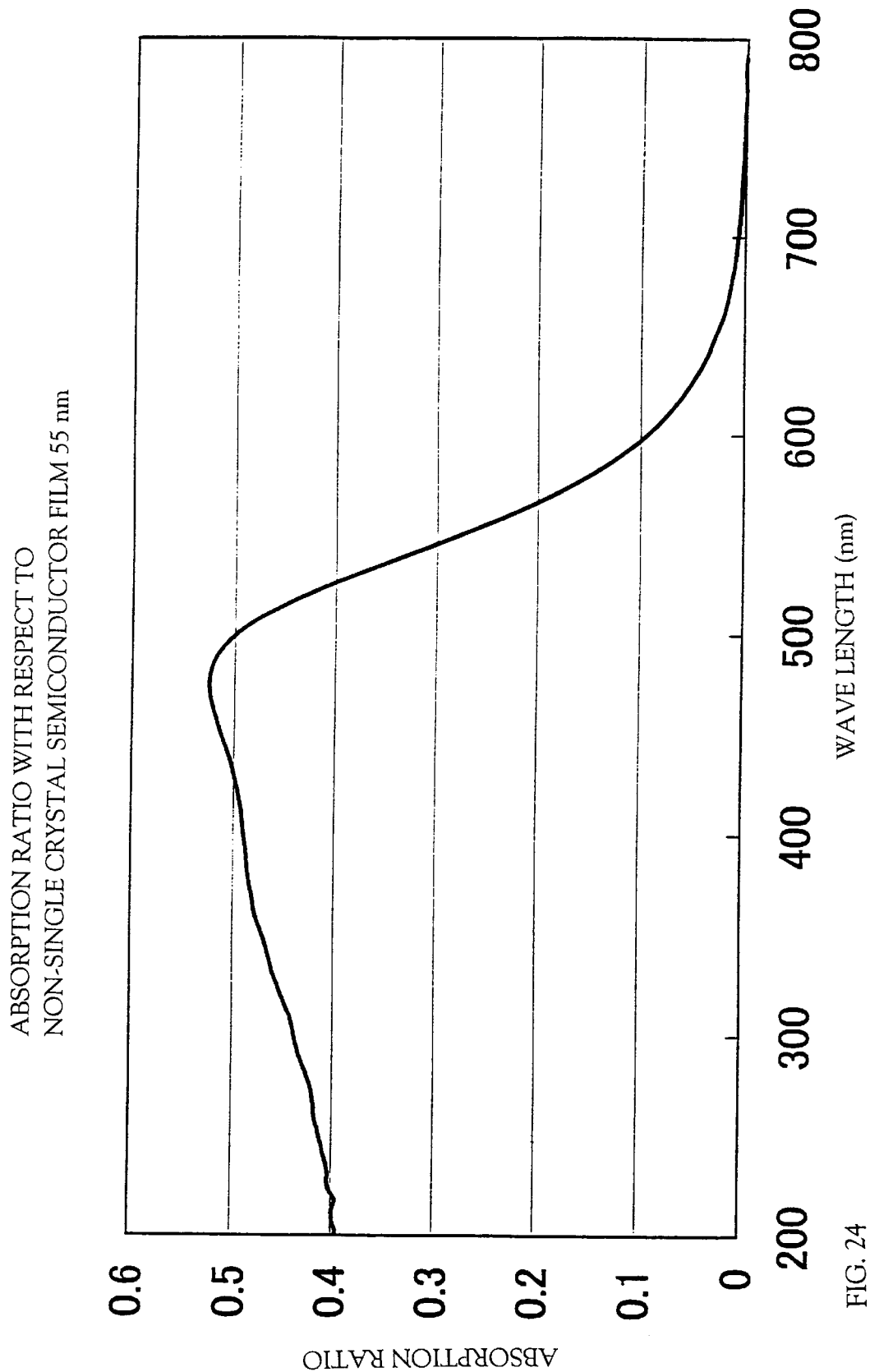
FIG. 24 is a graph showing an absorption ratio to a non-single crystal silicon film of the present invention.

Further, FIG. 24 shows a relationship between an absorption ratio and a wave length to be irradiated with respect to non-single crystal silicon film 55 nm. As shown in FIG. 24, the non-single crystal silicon film forming an active layer of the TFT seems to have a tendency to easily absorb light at a wave length region of 500 nm. In this wave length region of 500 nm, the reflection ratios of the first light shielding portion 15 and the second light shielding portion 16 can be suppressed to 10% or less, as shown in Table 1 and FIG. 3, thereby being capable of suppressing the degradation of TFTs by light.

Besides, if three colored layers are laminated into one, although the light shielding property is enhanced, the unevenness thereof enlarges as much three layers are laminated. As a result, the flatness of the substrate is eliminated to cause the disturbance of the liquid crystal layer. However, like the present invention, if only two colored layers are laminated into one, this is a level which hardly influences on the flatness of the substrate and on the liquid crystal layers.

As described above, the present invention is characterized in that the light shielding mask is formed from a lamination film consisting of two colored-layers R++B or R+G). As a result, a step of manufacturing the black matrix can be omitted, reducing the number of manufacturing steps.

Figure 2A:
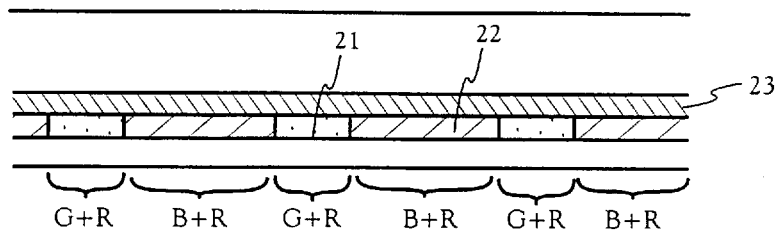
FIGS. 2A to 2C are cross-sectional views of the colored layers of the present invention.
Figure 2B:
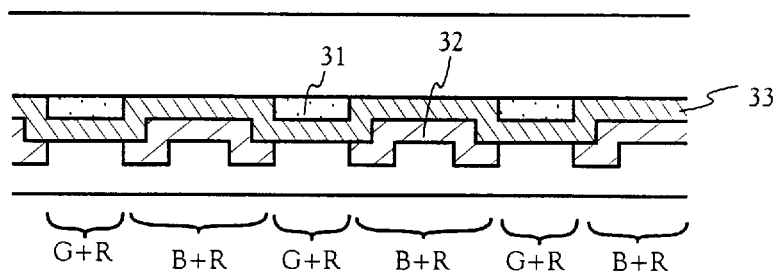
Figure 2C:
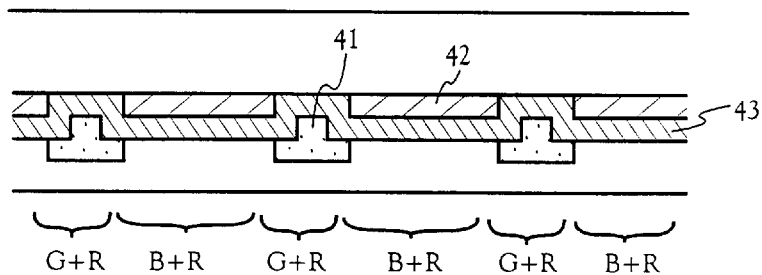

Note that, a cross-sectional view shown in FIG. 1B is one example, and therefore, particularly limited thereto. For example, structures shown in FIG. 2A to 2C may be employed. FIG. 2A shows an example in which a colored layer (R) 23 is first formed, and then a colored layer (B) 22 and a colored layer (G) 21 are laminated. FIG. 2B shows an example in which a colored layer (G) 31 is first formed, and then a colored layer (R) 33 and a colored layer (B) 32 are laminated. FIG. 2C shows an example in which a colored layer (B) 42 is first formed, and then a colored layer (R) 43 and a colored layer (G) 41 are laminated.

Figure 4A:
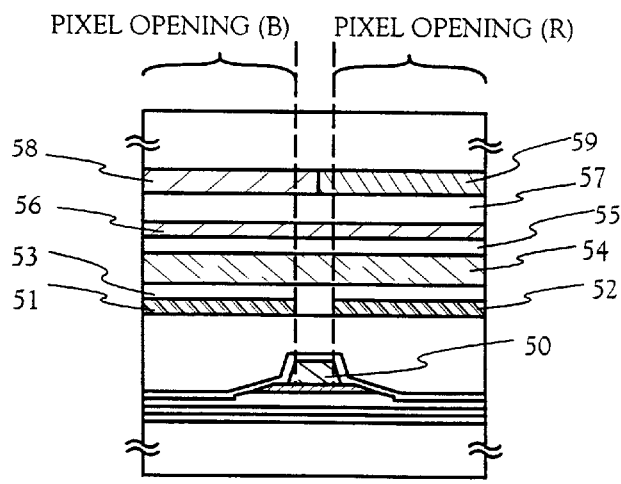
FIGS. 4A to 4C show an overlapping state of a wiring and the colored layers of the present invention.
Figure 4B:
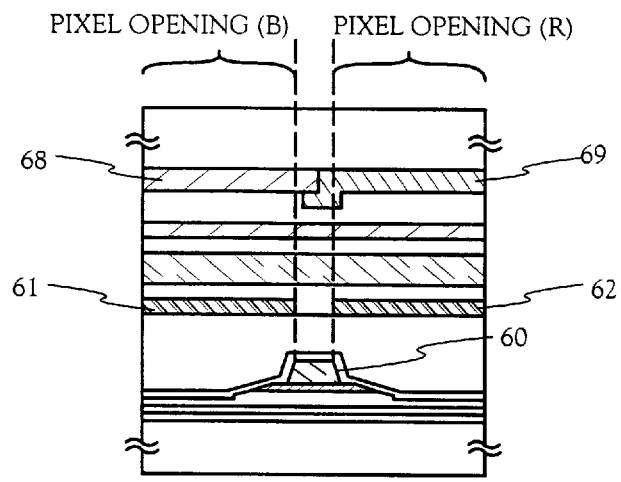
Figure 4C:
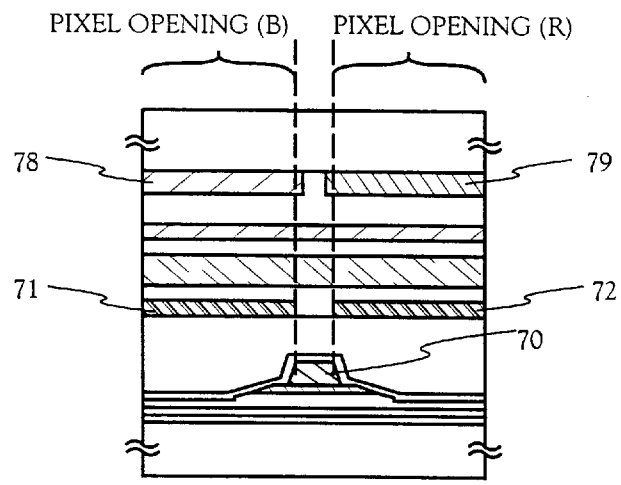

Further, a positional relationship among a wiring, a pixel electrode, and a colored layer between a pixel electrodes is shown in FIGS. 4A to 4C. FIG. 4A is an example in which an end portion of a colored layer (B) 58 and an end portion of a colored layer (R) 59 are contacted with each other above a source wiring 50, so as to shield between a pixel electrode 51 and a pixel electrode 52 from light, and the contact surface exists on the source wiring. Note that, in FIG. 4A, reference numerals 53 and 55 denote an orientation film; 54, a liquid crystal; 56, an opposing substrate; and 57, a leveling film.

Note that, without being limited to the example shown in FIG. 4A, a structure shown in FIG. 4B or FIG. 4C may be employed by taking the shift at the time of patterning on the colored layer into consideration. FIG. 4B is an example in which a colored layer (R) 69 is formed so as to partially overlap with an end portion of a colored layer (B) 58 above a source wiring 60, so as to shield between the pixel electrode 61 and the pixel electrode 62 from light. Further, FIG. 4C shows an example in which a colored layer (B) 78 and a colored layer (R) 79 are formed so as not to contact with each other above a source wiring 70 so as to shield between the pixel electrode 71 and the pixel electrode 72 from light.

Besides, light passed through the pixel openings 17 to 19 are colored into each corresponding color by a single layer of the colored layers 11 to 13, and are recognized by an observer. Note that FIG. 1C shows a sectional structure taken along the dash line (A2–A2') in FIG. 1A. As shown in FIG. 1C, a single layer of the colored layers 11 to 13 are succeedingly formed on the opposing substrate 10, and a leveling film 14 for covering these colored layers 11 to 13 is formed.

Figure 25:
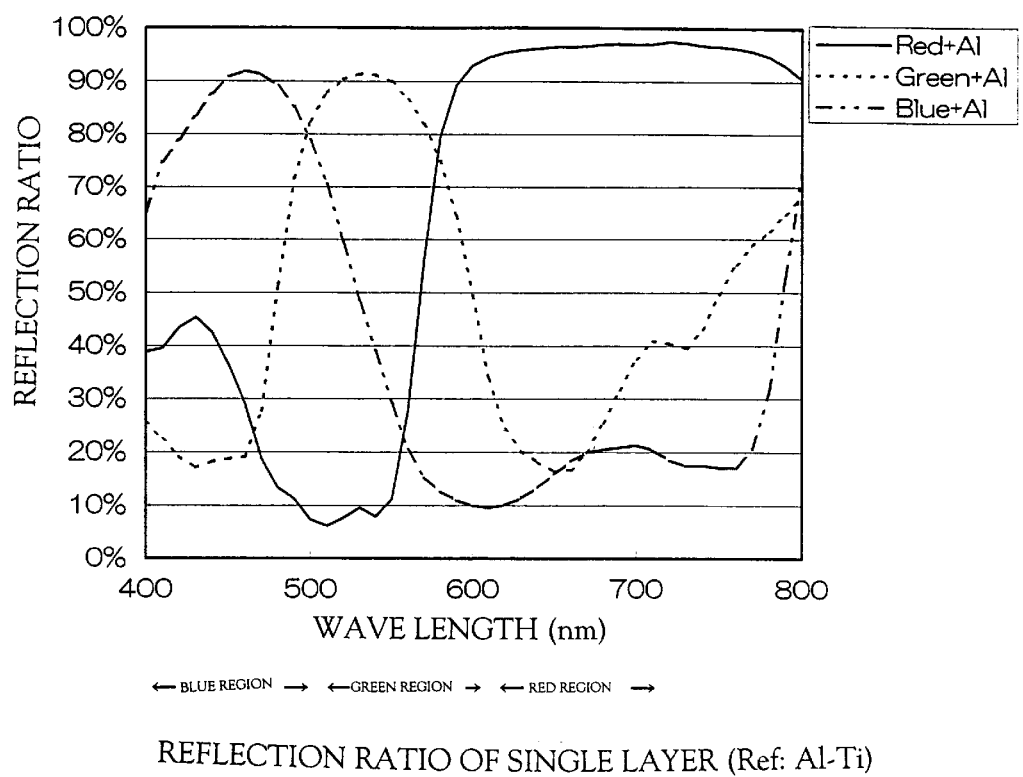
FIG. 25 is a graph showing a conventional reflectiveness by a single layer of a colored layer.

At a pixel opening, similar to the conventional case shown in FIG. 25, a blue-colored layer shows a reflection ratio exceeding 90% at the vicinity of 450 nm. Also, a green-colored layer shows a reflection ratio exceeding 90% at the vicinity of 530 nm. Further, a red-colored layer shows a reflection ratio exceeding 90% at the vicinity of 600 to 800 nm.

This is an example of the reflection type liquid crystal display device, and therefore, an incident light entered to the pixel openings 17 to 19 transmit a single layer of the colored layers 11 to 13, respectively, and then pass through the liquid crystal layer. After being reflected by the electrode, the light goes through again the liquid crystal layer, a single layer of the colored layers 11 to 13, respectively, and each color of light is extracted to be recognized by an observer.

Besides, as for the colored layers 11 to 13, various arrangements such as the simplest stripe pattern, a slant mosaic arrangement, a triangle mosaic arrangement, an RGBG four pixel arrangement, or an RGBW four pixel arrangement can be used.

In addition, arrangements of the colored layer according to the present invention may be adopted to a self-light emitting device using a light emitting element emitting a white color.

The present invention having the above-mentioned structure will be described in detail with reference to the following embodiments.

Embodiment 1

An embodiment of the present invention will be described hereinbelow with taking as an example a manufacturing of an opposing substrate which will be employed for an active matrix liquid crystal display device. FIGS. 1A–1C show an opposing substrate having colored layers which are formed according to the present invention.

First, as a substrate 10 having light translucent property, a glass substrate such as barium borosilicate glass or aluminum borosilicate, represented by such as Corning #7059 glass and #1737 glass is prepared. In addition to the above, a light translucent type substrate such as a quartz substrate and a plastic substrate may also be used.

Then, an organic photosensitive material (CGY-S705C: COLOR MOSAIC, manufactured by Fuji Film Olin Co.) is applied onto the opposing substrate 10, and the organic photosensitive material is patterned into stripe shape as shown in FIG. 1A by a photolithography method to form the green-colored layer (G) 11 at a predetermined position. In this case, the patterning is performed at the width of 42 $\mu$m.

Succeedingly, an organic photosensitive material (CVB-S706C: COLOR MOSAIC, manufactured by Fuji Film Olin Co.) is applied onto a predetermined position, and the organic photosensitive material is patterned into a shape as shown in FIG. 1A by the photolithography method to form the blue-colored layer (B) 12. Note that the blue-colored layer (B) 12 and the green-colored layer (G) 11 are formed so as not to overlap with each other.

Then, an organic photosensitive material (CRY-S778: COLOR MOSAIC, manufactured by Fuji Film Olin Co.) is applied onto a predetermined position, and the organic photosensitive material is patterned into a lattice shape as shown in FIG. 1A by the photolithography method to form the red-colored layer (R) 13. As shown in FIGS. 1A and 1B, the red-colored layer (G) 13 overlaps partially with the green-colored layer (G) 11 to form a first light shielding portion 15. On the other hand, as shown in FIG. 1C, among the green-colored layer (G) 11, a region not overlapping with the red-colored layer (R) 13 becomes a pixel opening 17 of a green color. Note that the first light shielding portion 15 is formed so as to overlap with a channel forming region of a TFT, upon sticking to the device substrate on which TFT is formed.

Further, as shown in FIGS. 1A and 1B, the red-colored layer (R) 13 partially overlaps with the blue-colored layer (B) 12 to form a second light shielding portion 16. On the other hand, as shown in FIG. 1C, among the blue-colored layer (B) 12, a region not overlapping with the red-colored layer (R) 13 becomes a pixel opening 18 of a blue color. In this embodiment, the size of the pixel opening 18 becomes 126 μm×42 μm. Note that the second light shielding portion 16 is also formed so as to overlap with a channel forming region of a TFT, upon sticking to the device substrate on which TFT is formed.

Besides, among the red-colored layers (R) 13, a region which is not overlapping with the green-colored layer (G) 11 and which is not overlapping with the blue-colored layer (B) 12, too, becomes a pixel opening 19 of a red color.

Thus, by three times of photolithography, the pixel openings 17 to 19, the first light shielding portion 15, and the second light shielding portion 16 can be formed.

Subsequently, a leveling film 14 for covering the respective colored layers is formed. Between a single layer of the colored layer and a two layer of the colored layer, about 1 to 1.5 μm of a step arises, and therefore the leveling film 14 has to have a film thickness of 1 μm or more, preferably 2 μm. As for the leveling film 14, an organic material having light transmission property, for example, an organic resin material such as polyimide, acryl, polyamide, polyimideamide, BCB (benzocyclobutene) may be used. However, if the flatness may be left outside, this leveling film is not necessary.

Note that, in this embodiment, an organic photosensitive material is applied, and patterned into a desired shape to obtain the respective colored layers 11 to 13. However, it is needless to say that the manufacturing method thereof is not particularly limited to those.

Hereafter, although not shown, an opposing substrate made from a transparent conductive film is formed on the leveling film, and further thereon, an orientation film for orientating the liquid crystal is formed, and furthermore, if necessary, the rubbing process is performed thereonto.

Using the opposing substrate thus obtained, an active matrix liquid crystal display device is manufactured.
Embodiment 2

In Embodiment 1, an example is shown in which the green-colored layer (G) 11, the blue-colored layer (B) 12, and the red-colored layer (R) 13 are formed in sequence. However, in this embodiment, a description will be made hereinbelow of an example of forming the respective colored layers in an order different from that in Embodiment 1. Note that, except the order of forming the respective colored layers, the other manufacturing steps are the same with that in Embodiment 1, thereby only different points will be described.

A structure shown in FIG. 2A may be taken as a first example. FIG. 2A shows an example in which a colored layer (R) 23 is first formed, and then, a colored layer (B) 22 and a colored layer (G) 21 are laminated thereon. Note that FIG. 2A corresponds to a sectional view taken along the dash line of A1–A1' of FIG. 1A.

Further, a structure shown in FIG. 2B may be employed as a second example. FIG. 2B is an example in which a colored layer (G) 31 is first formed, a colored layer (R) 33 is then formed, and thereafter a colored layer (B) 32 is laminated thereon. Note that FIG. 2B corresponds to a sectional view taken along the dash line of A1–A1' of FIG. 1A.

Besides, as a third example, it may take a structure shown in FIG. 2C. FIG. 2C is an example in which a colored layer (B) 42 is first formed, a colored layer (R) 43 is then formed, and thereafter a colored layer (G) 41 is laminated thereon. Note that FIG. 2C corresponds to a sectional view taken along the dash line of A1–A1' of FIG. 1A.
Embodiment 3

In this embodiment, a description will be made of a manufacturing method of a device substrate (also referred to as an active matrix substrate) which is stuck with an opposing substrate obtained in Embodiment 1 or Embodiment 2. Here, a method of simultaneously forming, on the same substrate, a pixel portion and TFTs (n-channel TFT and p-channel TFT) of a driver circuit formed in the periphery of the pixel portion, is described in detail.

First, in this embodiment, a substrate 100 is used, which is made from glass, such as barium borosilicate glass or aluminum borosilicate, represented by such as Corning #7059 glass and #1737. Note that, as the substrate 100, a quartz substrate, or a silicon substrate, a metal substrate, or a stainless substrate, on which an insulating film is formed, may be used as the replace. A plastic substrate having heat resistance to a process temperature of this embodiment may also be used.

Then, as shown in FIG. 5A, a base film 101 formed from an insulating film such as a silicon oxide film, a silicon nitride film or a silicon nitride oxide film. In this embodiment, a two-layer structure is used as the base film 101. However, a single-layer film or a lamination structure consisting of two or more layers of the insulating film may be used. As a first layer of the base film 101, a silicon nitride oxide film 102a is formed into a thickness of 10 to 200 nm (preferably 50 to 100 nm) using $SiH_4$, $NH_3$, and $N_2O$ as reaction gases by plasma CVD. In this embodiment, the silicon nitride oxide film 102a (composition ratio Si=32%, O=27%, N=24% and H=17%) having a film thickness of 50 nm is formed. Then, as a second layer of the base film 101, a silicon nitride oxide film 101b is formed so as to laminate thereon into a thickness of 50 to 200 nm (preferably 100 to 150 nm) using $SiH_4$ and $N_2O$ as reaction gases by plasma CVD. In this embodiment, the silicon nitride oxide film 101b (composition ratio Si=32%, O=59%, N=7% and H=2%) having a film thickness of 100 nm is formed.

Subsequently, semiconductor layers 102 to 106 are formed on the base film. The semiconductor layers 102 to 106 are formed from a semiconductor film having an amorphous structure by a known method (a sputtering method, an LPCVD method, or a plasma CVD method), and is subjected to a known crystallization process (a laser crystallization method, a thermal crystallization method, or a thermal crystallization method using a catalyst such as nickel). The crystalline semiconductor film thus obtained is patterned into desired shapes to obtain the semiconductor layers. The semiconductor layers 102 to 106 are formed into the thickness of from 25 to 80 nm (preferably 30 to 60 nm). The material of the crystalline semiconductor film is not particularly limited, but it is preferable to form the film using silicon, a silicon germanium (SiGe) alloy, or the like. In this embodiment, 55 nm thick amorphous silicon film is formed by plasma CVD, and then, nickel-containing solution is held on the amorphous silicon film. A dehydrogenation process of the amorphous silicon film is performed (500° C. for one hour), and thereafter a thermal crystallization process is performed (550° C. for four hours) thereto. Further, to improve the crystallinity thereof, laser anneal treatment is performed to form the crystalline silicon film. Then, this crystalline silicon film is subjected to a patterning process using a photolithography method, to obtain the semiconductor layers 102 to 106.

Further, after the formation of the semiconductor layers 102 to 106, a minute amount of impurity element (boron or phosphorus) may be doped to control a threshold value of the TFT.

Besides, in the case where the crystalline semiconductor film is manufactured by the laser crystal method, a pulse oscillation type or continuous-wave type excimer laser, YAG laser, or $YVO_4$ laser may be used. In the case where those lasers are used, it is appropriate to use a method in which laser light radiated from a laser oscillator is condensed by an optical system into a linear beam, and is irradiated to the amorphous semiconductor film. Although the conditions of the crystallization should be properly selected by an operator, in the case where the excimer laser is used, a pulse oscillation frequency is set as 30 Hz, and a laser energy density is as 100 to 400 $mJ/cm^2$ (typically 200 to 300 $mJ/cm^2$). In the case where the YAG laser is used, it is appropriate that the second harmonic wave is used to set a pulse oscillation frequency as 1 to 10 kHz, and a laser energy density is set as 300 to 600 $mJ/cm^2$ (typically, 350 to 500 $mJ/cm^2$). Then, laser light condensed into a linear shape with a width of 100 to 1000 $\mu$m, for example, 400 $\mu$m is irradiated to the whole surface of the substrate, and an overlapping ratio (overlap ratio) of the linear laser light at this time may be set as 80 to 98%.

A gate insulating film 107 is then formed for covering the semiconductor layers 102 to 106. The gate insulating film 107 is formed from an insulating film containing silicon by plasma CVD or sputtering into a film thickness of from 40 to 150 nm. In the embodiment, the gate insulating film 107 is formed from a silicon nitride oxide film into a thickness of 110 nm by plasma CVD (composition ratio Si=32%, O=59%, N=7%, and H=2%). Of course, the gate insulating film is not limited to the silicon nitride oxide film, an insulating film containing other silicon may be formed into a single layer of a lamination structure.

Beside, when the silicon oxide film is used, it can be formed by plasma CVD in which TEOS (tetraethyl orthosilicate) and $O_2$ are mixed, with a reaction pressure of 40 Pa, a substrate temperature of from 300 to 400° C., and discharged at a high frequency (13.56 MHz) power density of 0.5 to 0.8 $W/cm^2$. Good characteristics as the gate insulating film can be obtained in the silicon oxide film thus manufactured by subsequent thermal annealing at 400 to 500° C.

Then, on the gate insulating film 107, a first conductive film 108 and a second conductive film 109 having a film thickness of 20 to 100 nm and 100 to 400 nm, respectively are formed into lamination. In this embodiment, the first conductive film 108 made from a TaN film with a film thickness of 30 nm and the second conductive film 109 made from a W film with a film thickness of 370 nm are formed into lamination. The TaN film is formed by sputtering with a Ta target under a nitrogen containing atmosphere. Besides, the W film is formed by the sputtering method with a W target. The W film may be formed by thermal CVD using tungsten hexafluoride ($WF_6$). Whichever method is used, it is necessary to make these conductive films have low resistance for use as the gate electrode, and it is preferred that the resistivity of the W film is set to less than or equal to 20 $\mu\Omega$cm. By making the crystal grains large, it is possible to make the W film have lower resistivity. However, in the case where many impurity elements such as oxygen are contained within the W film, crystallization is inhibited and the resistance becomes higher. Therefore, in this embodiment, by forming the W film by sputtering using a target having a purity of 99.9999%, and in addition, by taking sufficient consideration to prevent impurities within the gas phase from mixing therein during the film formation, a resistivity of from 9 to 20 $\mu\Omega$cm can be realized.

Note that, in this embodiment, the first conductive film 108 is made of TaN, and the second conductive film 109 is made of W, but the material is not particularly limited thereto, and either film may be formed of an element selected from Ta, W, Ti, Mo, Al, and Cu, or an alloy material or a compound material containing the above element as its main ingredient. Besides, a semiconductor film typified by a polycrystalline silicon film doped with an impurity element such as phosphorus may be used. Besides, any combination may be employed such as a combination in which the first conductive film is formed of tantalum (Ta) and the second conductive film is formed of W, a combination in which the first conductive film is formed of tantalum nitride (TaN) and the second conductive film is formed of Al, or a combination in which the first conductive film is formed of tantalum nitride (TaN) and the second conductive film is formed of Cu.

Next, masks 110 to 115 consisting of resist are formed by using a photolithography method, and a first etching process for forming electrodes and wirings is carried out. In the first etching process, the first and the second etching conditions are used. Note that chlorine gas typified by $Cl_2$, $BCl_3$, $SiCl_4$, $CCl_4$, or the like, fluorine gas typified by $CF_4$, $SF_6$, $NF_3$, or the like, or $O_2$ may optionally be used as etching gases. In this embodiment, an ICP (Inductively Coupled Plasma) etching method is used, in which $CF_4$, $Cl_2$, and $O_2$ are used as the etching gases, a gas flowing rate of each gas is set as 25/25/10 (sccm), and an RF (13.56 MHz) power of 500 W is applied to a coil type electrode under a pressure of 1 Pa to generate plasma. Thus the etching is performed. An RF (13.56 MHz) power of 150 W is also applied to the side of the substrate (sample stage) and a substantially negative self bias voltage is applied thereto. Based on this first etching condition, the W film is etched to make an end portion of the first conductive layer into a tapered shape.

Thereafter, the etching condition is changed into a second etching condition, and the etching is performed, without removing masks 110 to 115 consisting of resist, in which $CF_4$ and $Cl_2$ are used as the etching gases, a gas flowing rate of each gas is set as 30/30 (sccm), and an RF (13.56 MHz) power of 500 W is applied to a coil type electrode under a pressure of 1 Pa to generate plasma. Thus, the etching is performed about 30 seconds. An RF (13.56 MHz) power of 20 W is also applied to the side of the substrate (sample stage) and a substantially negative self bias voltage is applied thereto. In the second etching condition, in which $CF_4$ and $Cl_2$ are mixed, the W film and the TaN film are etched in the same degree. Note that, in order to perform the etching without leaving a residue on the gate insulating film, it is appropriated that an etching time is increased at a rate on the order of 10 to 20%.

Under the above first etching condition, by making the shapes of the masks consisting of resist suitable, end portions of the first conductive layer and the second conductive layer become the tapered shape by the effect of the bias voltage applied to the substrate side. The angle of the taper portion becomes 15 to 45°. In this way, first shape conductive layers 117 to 122 consisting of the first conductive layers and the second conductive layers (the first conductive layers 117a to 122a and the second conductive layers 117b to 122b) are formed by the first etching process. Reference numeral 116 denotes a gate insulating film, and regions which are not covered with the first shape conductive layers 117 to 122 are etched by about 20 to 50 nm so that thinned regions are formed.

Then, a first doping process is performed without removing the masks consisting of resist, and an impurity element that imparts an n-type is added to the semiconductor layer. (FIG. 5B) Doping may be performed by ion doping or ion implanting. The condition of the ion doping method is such that a dosage is $1\times10^{13}$ to $5\times10^{15}$ atoms/cm$^2$, and an acceleration voltage is 60 to 100 keV. In this embodiment, the dosage is set as $1.5\times10^{15}$ atoms/cm$^2$, and the acceleration voltage is set as 80 keV. As the impurity element imparting the n-type, an element belonging to group 15, typically phosphorus (P) or arsenic (As) may be used, but phosphorus is used here. In this case, the conductive layers 117 to 121 become masks to the impurity element imparting the n-type, and first impurity regions 123 to 127 are formed in a self aligning manner. The impurity element imparting the n-type in the concentration range of $1\times10^{20}$ to $1\times10^{21}$ atoms/cm$^3$ is added to the first impurity regions 123 to 127.

Next, as shown in FIG. 5C, a second etching process is performed without removing the masks consisting of resist. In the second etching process, a third and a fourth etching conditions are used. The ICP etching method is similarly used by using the third etching condition, in which $CF_4$, and $Cl_2$ are used as the etching gases, a gas flowing rate of each gas is set as 30/30 (sccm), and an RF power (13.56 MHz) of 500 W is applied to a coil type electrode under a pressure of 1 Pa to generate plasma. Thus, the etching is performed about 60 seconds. An RF (13.56 MHz) power of 20 W is applied to the side of the substrate (sample stage) and a low self bias voltage as compared with the first etching process is applied thereto. In the third etching condition, in which $CF_4$, and $Cl_2$ are mixed, the W film and the TaN film are etched in the same degree.

Thereafter, the etching condition is changed into a fourth etching condition, and the etching is performed, without removing masks consisting of resist, in which $CF_4$, $Cl_2$, and $O_2$ are used as the etching gases, a gas flowing rate of each gas is set as 25/25/10 (sccm), and an RF (13.56 MHz) power of 500 W is applied to a coil type electrode under a pressure of 1 Pa to generate plasma. Thus, the etching is performed about 20 seconds. An RF (13.56 MHz) power of 20 W is also applied to the side of the substrate (sample stage) and a low self bias voltage as compared with the first etching process is applied thereto. In accordance with the fourth etching condition, the W film is etched.

Like this, in accordance with the third and fourth etching conditions, the W film is anisotropically etched, and the TaN film is anisotropically etched at an etching rate lower than the W film to form second shape conductive layers 129 to 134 (first conductive layers 129a to 134a and second conductive layers 129b to 134b). Reference numeral 128 designates a gate insulating film, and regions which are not covered with the second shape conductive layers 129 to 134 are etched into a film thickness of about 20 to 50 nm, which is thin.

An etching reaction to the W film or the TaN film by the mixture gas of $CF_4$ and $Cl_2$ can be guessed from a generated radical or ion species and the vapor pressure of a reaction product. When the vapor pressures of fluoride and chloride of W and TaN are compared with each other, $WF_6$ as fluoride of W is extremely high, and other $WCl_5$, $TaF_5$, and $TaCl_5$ have almost equal vapor pressures. Thus, in the mixture gas of $CF_4$ and $Cl_2$, both W and TaN films are etched. However, when a suitable amount of $O_2$ is added to this mixture gas, $CF_4$ and $O_2$ react with each other to form CO and F, and a large number of F radicals or F ions are generated. As a result, an etching rate of the W film having the high vapor pressure of fluoride is increased. On the other hand, with respect to TaN, even if F is increased, an increase of the etching rate is relatively small. Besides, since TaN is easily oxidized as compared with W, the surface of TaN is oxidized a little by an addition of $O_2$. Since the oxide of TaN does not react with fluorine or chlorine, the etching rate of the TaN film is further decreased. Accordingly, it becomes possible to make a difference between the etching rates of the W film and the TaN film, with the result that it becomes possible to make the etching rate of the W film higher than that of the TaN film.

Subsequently, as shown in FIG. 6A, a second doping process is performed without removing the masks consisting of resist. In this case, a dosage is made lower than that of the first doping process, and an impurity element imparting the n-type is doped under the condition of a higher acceleration voltage. For example, an acceleration voltage is set as 70 to 120 keV, in this embodiment 90 keV, and the process is carried out at a dosage of $3.5\times10^{12}$ atoms/cm$^2$, so that new impurity regions are formed on the semiconductor layer inside the first impurity regions formed in FIG. 5B. The doping is performed in such a manner that the second shape conductive layers 129b to 133b are used as the masks to the impurity element, and the impurity element is added also to the semiconductor layer under the tapered shape portion of the second conductive layers 129a to 133a.

Note that the masks consisting of resist may be removed before performing the second doping process.

In this way, third impurity regions 140 to 144 overlapping with the second conductive layers 129a to 133a, and second impurity regions 135 to 139 between first impurity regions 145 to 149 and the third impurity regions are formed. The impurity element imparting the n-type is made to have a concentration of $1\times10^{17}$ to $1\times10^{19}$ atoms/cm$^3$ in the second impurity regions, and a concentration of $1\times10^{16}$ to $1\times10^{18}$ atoms/cm$^3$ in the third impurity regions. Note that, in the third impurity regions 140 to 144 the impurity element imparting the n-type at least contained in an overlapping portion with the second shape conductive layers 129a to 133a includes concentration change. In other words, the concentration of phosphorus (P) to be added to the third impurity regions 140 to 144 becomes gradually lower at the portion overlapping with the second shape conductive layers, as it advances from the edge portion of the conductive layer thereof toward the inside. This is because the concentrations of phosphorus (P) that reach to the semiconductor layer are changed due to the difference in the film thickness of the tapered portion.

Then, after removing the masks consisting of resist, newly masks 150 to 152 consisting of resist are formed, and a third doping process is performed as shown in FIG. 6B. With this third doping process, fourth impurity regions 153 to 158 in which an impurity element imparts a conductivity opposite to the one conductivity type, are formed in the semiconductor layer that becomes an active layer of p-channel TFT. The second shape conductive layers 130 and 133 are used as the masks with respect to the impurity elements, and an impurity imparting a p-type is added to form the fourth impurity regions in a self aligning manner. In this embodiment, the impurity regions 153 to 158 are formed by ion doping using diborane ($B_2H_6$). At the time of performing the third doping process, the semiconductive layer forming the n-channel TFT is covered with masks 150 to 152 consisting of resist. With the first and the second doping processes, the impurity regions 153 to 158 are doped with phosphorus in different concentrations, respectively. However, doping is performed so that the concentration of the impurity imparting p-channel in any of the regions falls within the range of $2\times10^{20}$ to $2\times10^{21}$ atoms/cm$^3$, with the result that the regions function as source and drain regions of the p-channel TFT, which causes no problem.

By the steps up to this, the impurity regions are formed in the respective semiconductor layers. The second shape conductive layers 129 to 132 overlapping with the semiconductor layers function as gate electrodes. Besides, the conductive layer 134 functions as a source wiring, and the conductive layer 133 functions as a second electrode for forming a storage capacitor.

Subsequently, the masks 150 to 152 consisting of resist are removed, and a first interlayer insulating film 159 covering the whole surface is formed. This first interlayer insulating film 159 is formed from an insulating film containing silicon by plasma CVD or sputtering into a thickness of 100 to 200 nm. In this embodiment, a silicon nitride oxide film with a film thickness of 150 nm is formed by plasma CVD. Of course, the first interlayer insulating film 159 is not particularly limited to the silicon nitride oxide film, but an insulating film containing other silicon may be formed into a single layer or a lamination structure.

Then, as shown in FIG. 6C, a step of activating the impurity elements added in the respective semiconductor layers. This step is carried out by thermal annealing using a furnace annealing oven. The thermal annealing may be performed in a nitrogen atmosphere having an oxygen content of 1 ppm or less, preferably 0.1 ppm or less and at 400 to 700° C., typically 500 to 600° C. In this embodiment, a heat treatment at 500° C. for 4 hours is carried out. Note that, other than the thermal annealing method, a laser annealing method, or a rapid thermal annealing method (RTA method) can be applied thereto.

Note that, in this embodiment, at the same time with the above activation process, nickel used as the catalyst for crystallization is gettered to the impurity regions 145 to 149, 153 and 156 containing phosphorous at high concentration. As a result, nickel concentration of the semiconductor layer which becomes a channel forming region is mainly lowered. The TFT having a channel forming region thus formed is decreased in off current, and has high electric field mobility because of good crystallinity, thereby attaining satisfactory characteristics.

Further, an activation process may be performed before forming the first interlayer insulating film 159. However, in the case where a wiring material used for the layers 129 to 134 is weak to heat, it is preferable that the activation process is performed after an interlayer insulating film (containing silicon as its main ingredient, for example, silicon nitride oxide film) is formed to protect the wiring or the like as in the present embodiment.

Figure 7:
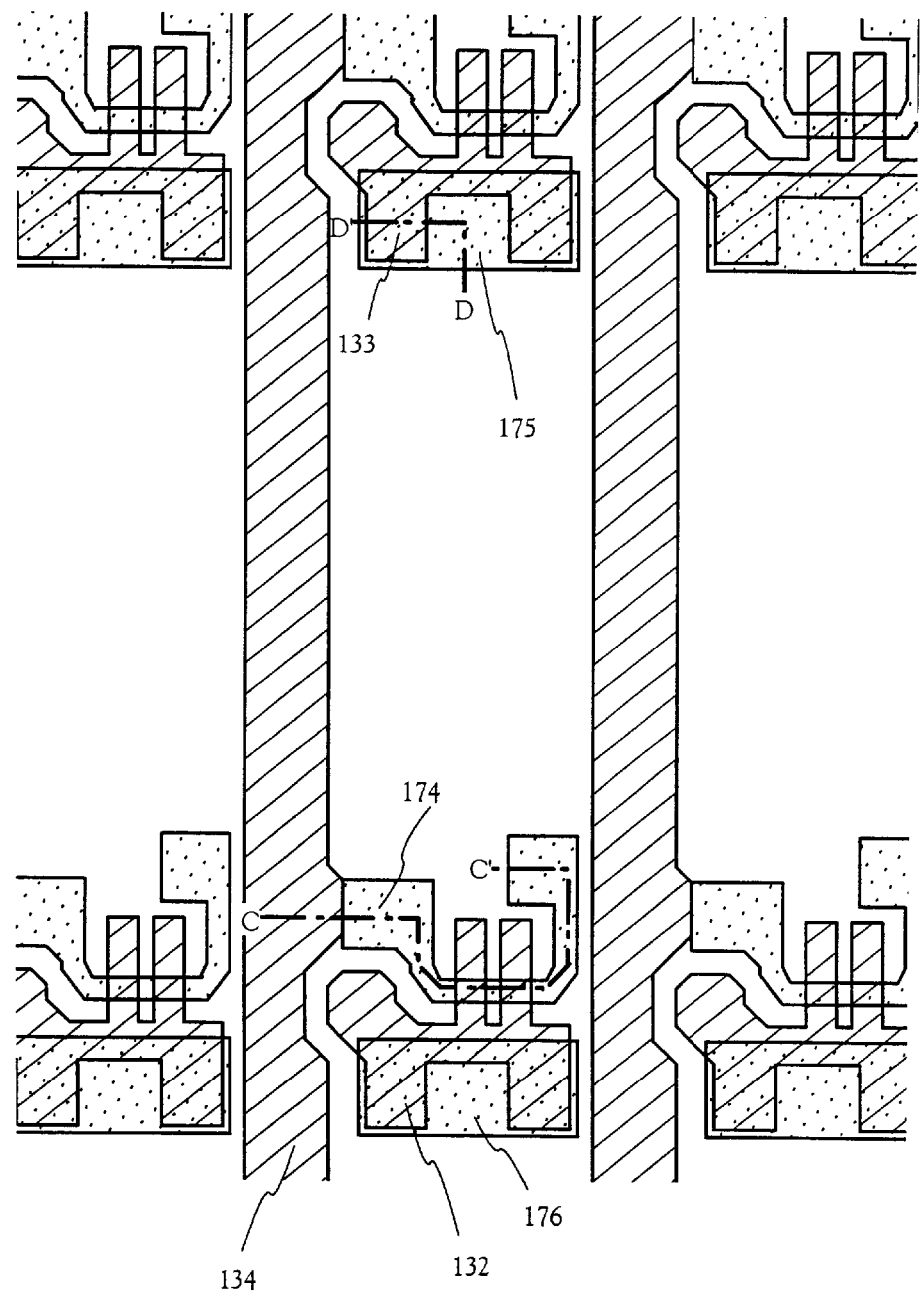
FIG. 7 is a diagram showing a top view of a pixel of Embodiment 3.

Besides, a top view of the pixel portion after the activation process described above is shown in FIG. 7. Note that the same reference numerals are used to indicate parts corresponding FIGS. 5A to 5C and FIG. 6. A dash line C–C' in FIGS. 5A to 5C and 6A to 6C corresponds to a sectional view taken along the line C–C' in FIG. 7. Also, a dash line D–D' in FIGS. 5A to 5C and 6A to 6C corresponds to a sectional view taken along the line C–C' in FIG. 7.

In addition, heat treatment at 300 to 550° C. for 1 to 12 hours is performed in an atmosphere containing hydrogen of 3 to 100% to perform a step of hydrogenating the semiconductor layers. In this embodiment, the heat treatment is performed at 350° C. for 1 hour in an atmosphere containing hydrogen of 100%. This step is a step of terminating dangling bonds in the semiconductor layer by thermally excited hydrogen. As another means for hydrogenation, plasma hydrogenation (using hydrogen excited by plasma) may be carried out.

Besides, heat treatment (at 300 to 550° C. for 1 to 12 hours) may be performed using hydrogen contained in the interlayer insulating film formed from a silicon nitride film to perform the hydrogenation of the semiconductor layer. In this case, if the heat treatment is performed at 410° C. for 1 hour in a nitrogen atmosphere, the dangling bond in the semiconductor layer may be terminated due to oxygen contained in the interlayer insulating film.

Besides, in the case of using a laser annealing method as the activation process, it is preferred to irradiate laser light such as an excimer laser or a YAG laser after the hydrogenating process.

Next, a second interlayer insulating film 160 made of an organic insulating material is formed on the first interlayer insulating film 159. In this embodiment, an acrylic resin film having a film thickness of 1.6 μm is formed. Then, patterning is performed for forming a contact hole reaching the source wiring 134 and the contact holes reaching the respective impurity regions 145, 147, 148, 153, and 156.

Then, in a driver circuit 406, wirings 161 to 166 electrically connecting to the first impurity region or the fourth impurity region, respectively, are formed. Note that these wirings are formed by patterning a lamination film of a Ti film with a film thickness of 50 nm and an alloy film (alloy film of Al and Ti) with a film thickness of 500 nm.

In a pixel portion 407, a pixel electrode 169, a gate wiring 168, and a connection electrode 167 are formed. (FIG. 8) By this connection electrode 167, the source wiring 134 is electrically connected to a pixel TFT 404. Also, the gate wiring 168 is electrically connected to the first electrode (second shape conductive layer 133). Besides, the pixel electrode 169 is electrically connected to the drain region of the pixel TFT, and further connected to the semiconductor layer which functions as one of electrodes forming a storage capacitor. Further, as the pixel electrode 169, a film containing Al or Ag as the main component, or a lamination film thereof is preferably used, which has excellent reflection property.

In the manner as described above, the driving circuit 406 including an n-channel TFT 401, a p-channel TFT 402, and a n-channel TFT 403 and the pixel portion 407 including the pixel TFT 404 and a storage capacitor 405 can be formed on the same substrate. In the present specification, such a substrate is called an active matrix substrate for convenience.

The n-channel TFT 401 of the driving circuit 406 includes a channel forming region 170, the third impurity region 140 (GOLD region) overlapping with the second shape conductive layer 129 forming the gate electrode, the second impurity region 135 (LDD region) formed outside the gate electrode, and the first impurity region 145 functioning as a source region or a drain region. The p-channel TFT 402 includes a channel forming region 171, a fourth impurity region 155 overlapping with the second shape conductive layer 130 forming the gate electrode, a fourth impurity region 154 formed outside the gate electrode, and the fourth impurity region 153 functioning as a source region or a drain region. The n-channel TFT 403 includes a channel forming region 172, the third impurity region 142 (GOLD region) overlapping with the second shape conductive layer 131 forming the gate electrode, a second impurity region 137 (LDD region) formed outside the gate electrode, and the first impurity region 147 functioning as a source region or a drain region.

The pixel TFT 404 of the pixel portion 407 includes a channel forming region 173, the third impurity region 143 (GOLD region) overlapping with the second shape conductive layer 132 forming the gate electrode, a second impurity region 138 (LDD region) formed outside the gate electrode, and the first impurity region 148 functioning as a source region or a drain region. Besides, impurity elements imparting p-type are added to the respective semiconductor layers 156 to 159 functioning as one of electrodes of the storage capacitor 405 at the same concentration with the fourth impurity region. The storage capacitor 405 is formed from the second electrode 133 and the semiconductor layers 156 to 159 using the insulating film (the same film with the gate insulating film) as a dielectric member.

Figure 8:
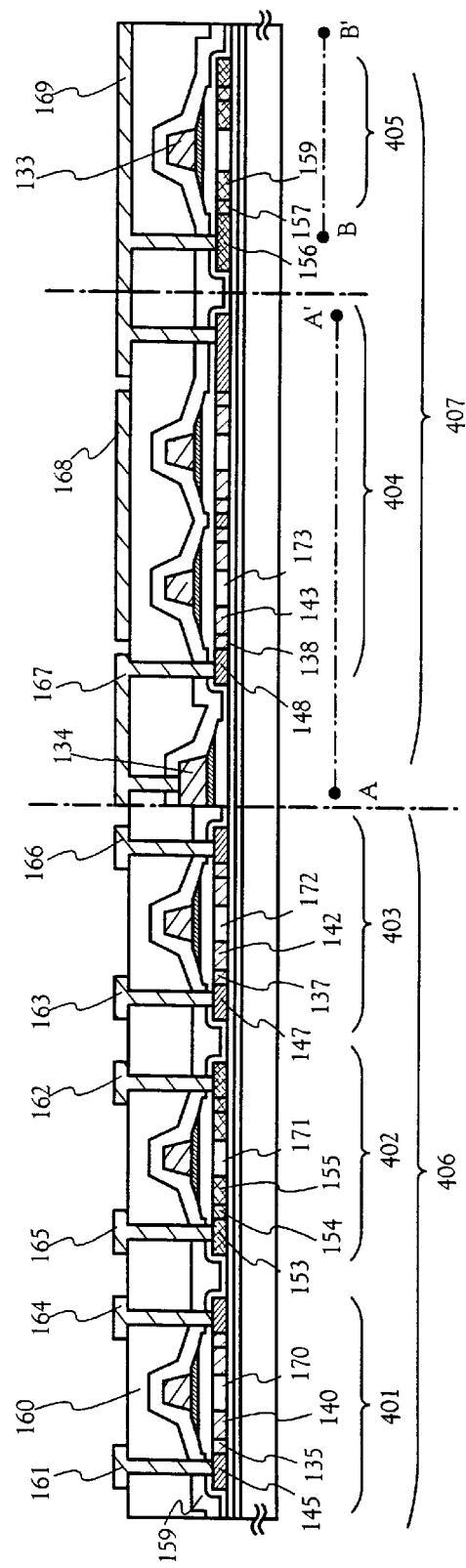
FIG. 8 shows a manufacturing process of AM-LCD of Embodiment 3.
Figure 9:
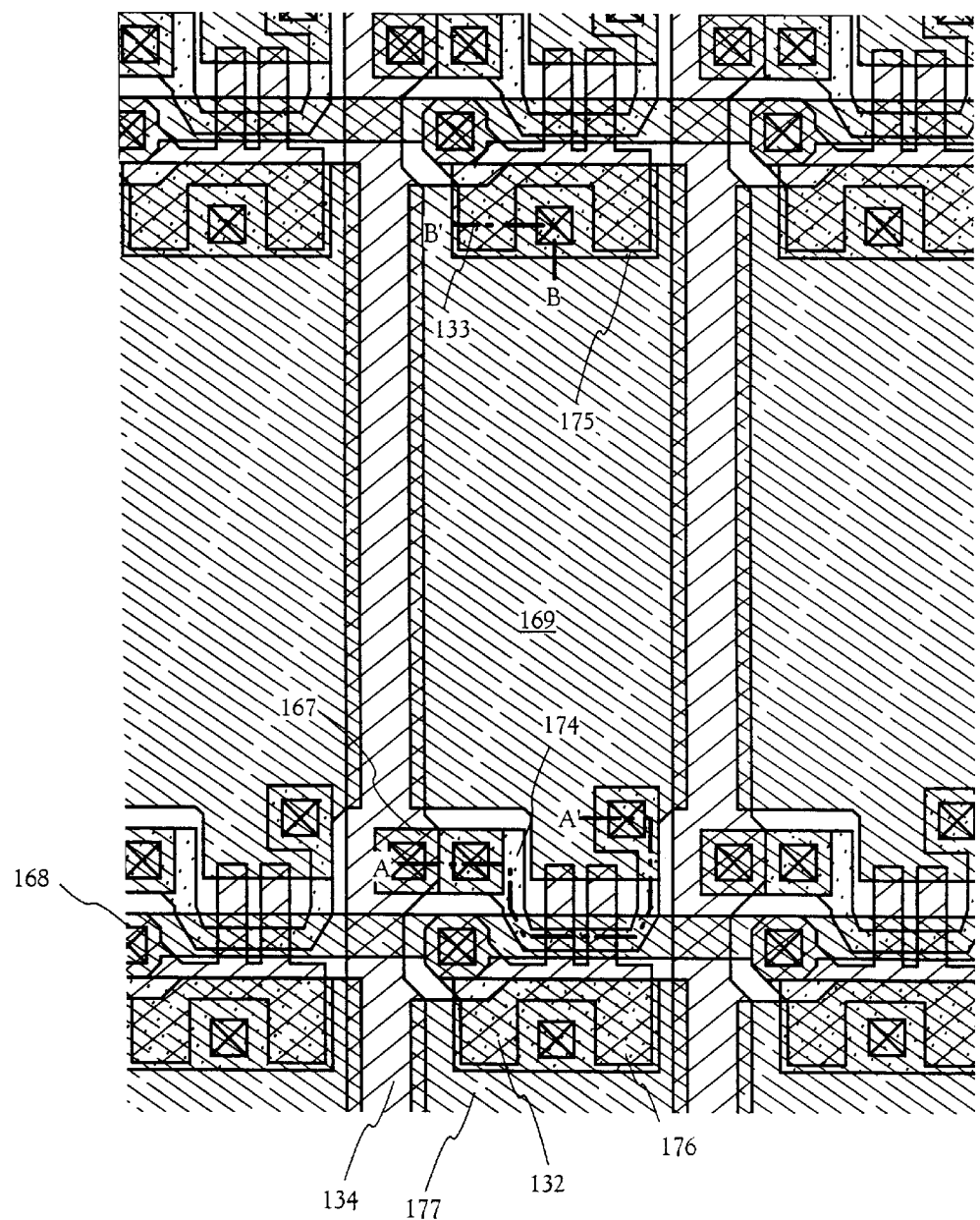
FIG. 9 is a diagram showing a top view of the pixel of Embodiment 3.

A top view of the pixel portion of the active matrix substrate manufactured in this embodiment is shown in FIG. 9. Note that the same reference numerals are used to indicate parts corresponding FIGS. 5A to 5C and FIGS. 6A to 6C, 7 and 8. A dash line A–A' in FIG. 9 corresponds to a sectional view taken along the line A–A' in FIG. 8. Also, a dash line B–B' in FIG. 9 corresponds to a sectional view taken along the line B–B' in FIG. 8.

Like this, the active matrix substrate having a pixel structure according to the present embodiment has a feature such that the first electrode 132 a part of which functions as the gate electrode and a gate wiring 168 are formed on the different layers so that the light shielding of the semiconductor layers are performed by the gate wiring 168.

Further, in the pixel structure of the present embodiment, an end portion of the pixel electrode is formed by arranging it so as to overlap with the source wiring so that the gap between the pixel electrodes is shielded from light without using a black matrix.

Besides, the surface of the pixel electrode in accordance with the present embodiment is made uneven by means of a known method such as a sand plaster method and an etching method, and it is preferred that a whitening degree is increased by scattering the reflection light, while preventing mirror-reflection.

By taking the above-mentioned pixel structure, a pixel electrode having a larger area may be arranged, thereby capable of improving an opening ratio.

In addition, in accordance with the process steps of the present embodiment, the number of photo masks needed for the manufacture of the active matrix substrate may be made into five pieces (a semiconductor layer patterning mask, a first wiring patterning mask (including the first electrode 132, the second electrode 133, and the source wiring 134), a p-type TFT patterning mask, a second wiring patterning mask (including the pixel electrode 169, the connection electrode 167, and the gate wiring 168). As a result, it can contribute to shorten the manufacturing steps, to lower the manufacturing cost, and to improve the yields.

Embodiment 4

Figure 10:
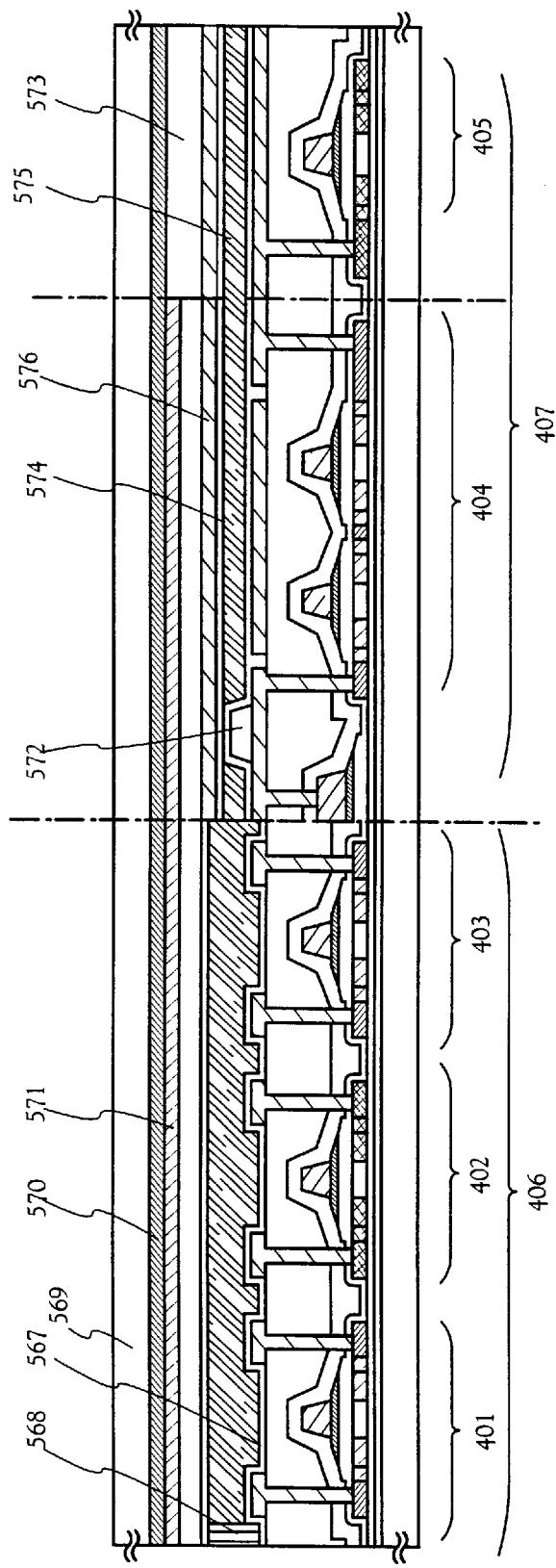
FIG. 10 is a sectional view showing the structure of an active matrix liquid crystal display device of Embodiment 4.

In this embodiment, a manufacturing process of an active matrix liquid crystal display device from the active matrix substrate manufactured in accordance with Embodiment 3 will be described hereinbelow. FIG. 10 is used for an explanation thereof.

First, in accordance with Embodiment 3, an active matrix substrate in a state shown in FIG. 8 is obtained, and thereafter, an orientation film 567 is formed on the active matrix substrate of FIG. 8, and is subjected to a rubbing process. Note that, in this embodiment, before the formation of the orientation film 567, a spacer 572 for maintaining a gap between the substrates is formed at a desired position by patterning an organic film such as an acrylic resin film. Further, spherical spacers may be scattered on the entire surface of the substrate in place of the columnar like spacer.

Next, an opposing substrate 569 is prepared. In accordance with Embodiment 1, colored layers 570, 571 and a leveling film 573 are formed on the opposing substrate 569. The red-colored layer 570 and the blue-colored layer 571 are partially overlapped with each other, thereby forming a second light shielding portion. Note that, although not shown in FIG. 10, the red-colored layer and a green-colored layer are partially overlapped with each other, thereby forming a first light shielding portion.

Subsequently, an opposing electrode 576 is formed in a pixel portion, and an orientation film 574 is formed on the entire surface of the opposing substrate. Then, the rubbing process is performed thereon.

Then, the active matrix substrate on which a pixel portion and a driver circuit are formed is stuck with the opposing substrate by a sealing agent 568. In the sealing agent 568, filler is mixed, and the two substrates are stuck with each other while keeping a uniform gap by the effect of this filler and the columnar spacer 572. Thereafter, a liquid crystal material is injected between both substrates to encapsulate the substrate completely by an encapsulant (not shown). A known liquid crystal material may be used as the liquid crystal material. Thus the active matrix liquid crystal display device shown in FIG. 10 is competed.

In this embodiment, the substrate shown in Embodiment 3 is used. Accordingly, in FIG. 9 showing a top view of the pixel portion in accordance with Embodiment 3, light shielding must be performed at least gaps between the gate wiring 168 and the pixel electrodes 169, 177, a gap between the gate wiring 168 and the connection electrode 167, and a gap between the connection electrode 167 and the pixel electrode 169. In this embodiment, the opposing substrate and the active matrix substrate are stuck so that the first light shielding portion and the second light shielding portion overlap with the positions which need to be shielded from light.

Figure 11:
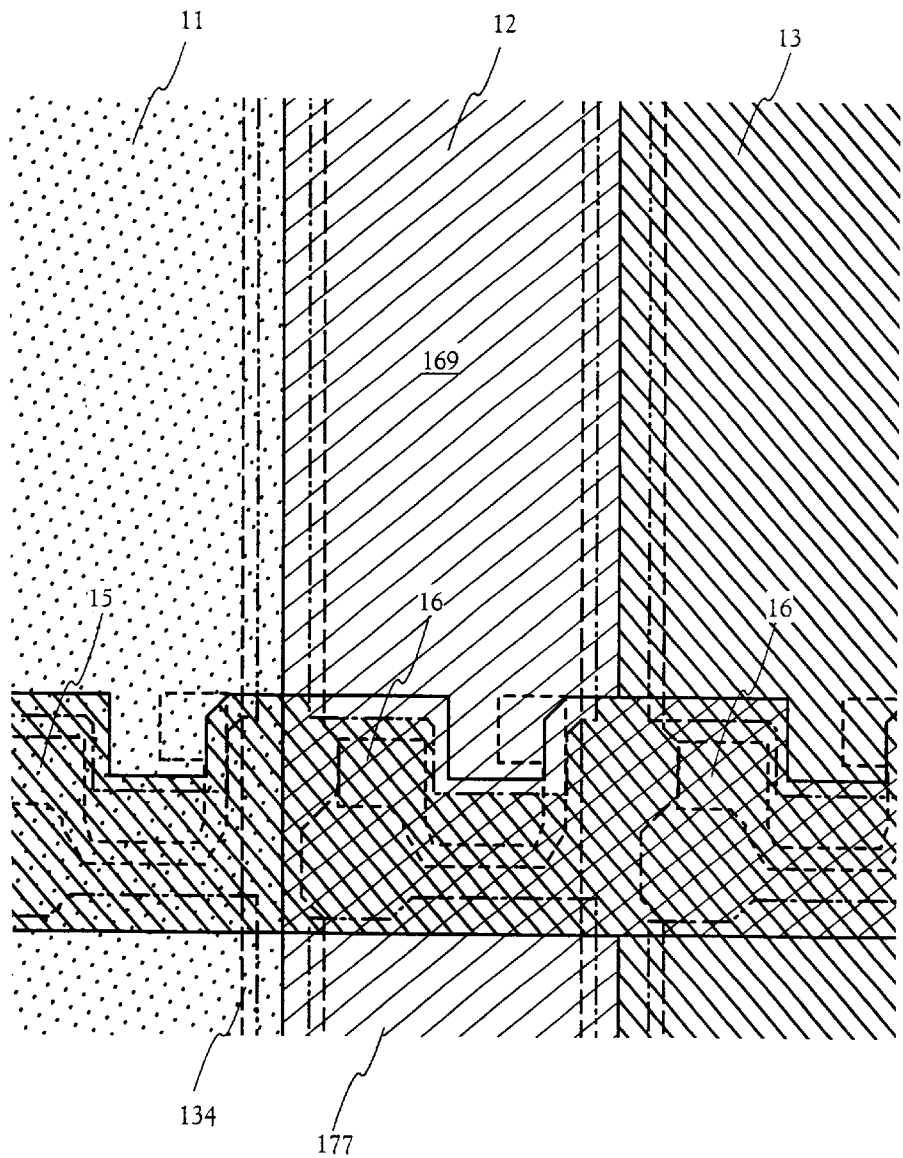
FIG. 11 is a view showing an arrangement of the colored layers of Embodiment 4.

Note that, FIG. 11 is a schematic view showing a part of the pixel portion of the completed liquid crystal display device. In FIG. 11, a colored layer (B) 12 is formed so as to overlap with the pixel electrode 169 indicated by a dash line. Note that, in FIG. 11, parts correspond to that in FIG. 1A are indicated by the same reference numerals. Besides, the gap between the pixel electrode 169 and the adjacent electrode 177 is shielded from light by the second light shielding portion 16. This second light shielding portion 16 is formed from a colored layer (B) and colored layer (R) which are overlapped with each other. This second light shielding portion 15 also shield the adjacent a pixel TFT of the pixel (R) from light. Besides, an end portion of the colored layer (B) 12 and an end portion of a colored layer (G) 11 are formed on the source wiring 134 indicated by a dotted line. Further, a first light shielding portion 15 is formed by overlapping the colored layer (G) and the colored layer (R). In addition, in FIG. 11, a patterning is performed so that the end portion of the colored layer (B) overlapping with the source wiring comes in contact with the end portion of the colored layer (G). Besides, similarly, a pattering is performed so that an end portion of the colored layer (R) overlapping with the source wiring is comes in contact with the end portion of the colored layer (G).

Like this, without using a black mask, the gaps between the respective pixels are shielded from light by the first light shielding portion 15 and the second light shielding portion 16. As a result, the reduction of the manufacturing steps can be attained.

Embodiment 5

A structure of the active matrix liquid crystal display device obtained using Embodiment 4 (see FIG. 10) is explained with reference to the top view shown in FIG. 12. Note that portions corresponding to FIG. 10 are denoted by the same reference numerals.

Figure 12:
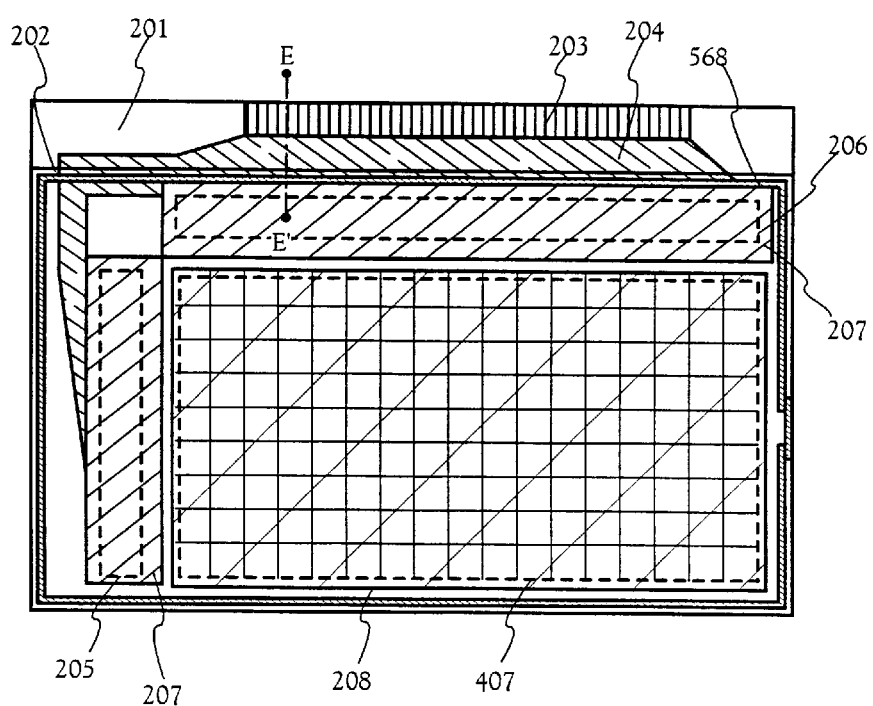
FIG. 12 is a view showing an appearance of the AM-LCD of Embodiment 5.

In the top view shown in FIG. 12, an active matrix substrate 201 on which components such as a pixel portion, a driver circuit, an external input terminal 203 for attaching thereto an FPC (flexible printed circuit), and a wiring 204 for connecting the external input terminal to an input portion of each circuit are formed, and an opposing substrate 202 on which components such as colored layers are formed, are joined, sandwiching the sealing agent 568 in between.

A light shielding portion 207 is formed on the opposing substrate side, above a gate wiring side driver circuit 205 and a source wiring side driver circuit 206, from a red color filter or a lamination of a red color filter and a blue color filter. Further, regarding color filters 208 formed on the opposing substrate side above the pixel portion 407, red, green, and blue colored layers are formed corresponding to each pixel. Color display is achieved by three colors from a red (R) colored layer, a green (G) colored layer, and a blue (B) colored layer when performing actual display, but the arrangement of the colored layers is arbitrary.

Figure 13A:
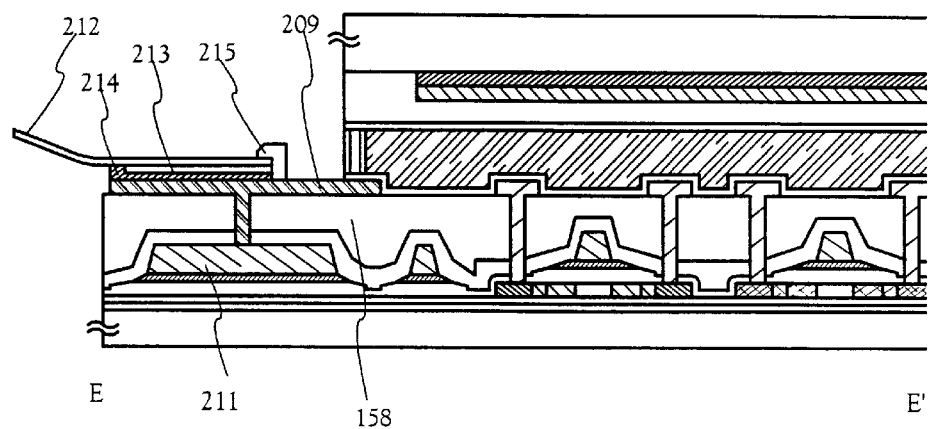
FIGS. 13A and 13B are cross-sectional views showing a terminal portion of the AM-LCD of Embodiment 5.

FIG. 13A shows a cross sectional view taken along the line E–E' of the external input terminal 203 shown in FIG. 12. The external input terminal is formed on the active matrix substrate side, and in order to reduce interlayer capacitance and wiring resistance, and prevent defects due to broken wirings, the external input terminal is connected to a wiring 211 formed from the same layer as the gate wiring by a wiring 209 formed from the same layer as the pixel electrode, sandwiching an interlayer insulating film 210 in between.

Further, an FPC composed of a base film 212 and a wiring 213 is joined to the external input terminal by an anisotropic conductive resin 214. In addition, the mechanical strength is increased by a reinforcing plate 215.

Figure 13B:
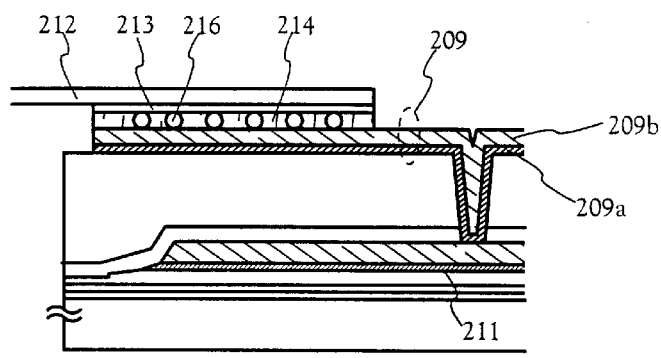

FIG. 13B shows a detailed diagram thereof, and shows a cross sectional view of the external input terminal shown in FIG. 13A. The external input terminal formed on the active matrix substrate side is composed of the wiring 211, which is formed from the same layer as the gate wiring, and of the wiring 209, which is formed from the same layer as the pixel electrode. Of course, this is merely an example showing the structure of a terminal portion, and the terminal portion may be formed from only one of the wirings. For example, when forming it from the wiring 211 which is formed of the same layer as the gate wiring, it is necessary to remove the interlayer insulating film formed on the wiring 211. The wiring 209, which formed from the same layer as the pixel electrode, has a two layer structure of a Ti film 209a, an alloy film (an alloy film of Al and Ti) 209b. The FPC is composed of the base film 212 and the wiring 213. The wiring 213 and the wiring 209 formed from the same layer as the pixel electrode are joined by an anisotropic conductive adhesive composed of conductive particles 216 dispersed within a thermosetting adhesive 214, forming an electrically connected structure.

An active matrix liquid crystal display device thus manufactured can be used as a display unit of all types of electronic apparatus.

Embodiment 6

In this embodiment, a description will be made of a manufacturing method of an active matrix substrate different from that in Embodiment 3 with reference to FIGS. 14A to 14D, FIGS. 15A to 15C, and FIG. 16. In Embodiment 3, an impurity element imparting an n-type is added to form an impurity region in a self aligning manner. However, in this embodiment, the number of masks is increased by one to form a source region or a drain region of an n-channel TFT, which is a characteristic of this embodiment.

Note that, the other structure has been already described in Embodiment 3, and therefore reference is made to Embodiment 3 as to the detailed structure thereof Here, the description thereof is omitted.

First, the same state shown in FIG. 1A is obtained in accordance with Embodiment 3. The drawing that corresponds to FIG. 1A is FIG. 14A, and therefore the same reference numeral are used.

Next, masks 601 to 607 consisting of resist are formed by using a photolithography method, and a first etching process for forming electrodes and wirings is carried out. Note that chlorine gas typified by $Cl_2$, $BCl_3$, $SiCl_4$, $CCl_4$, or the like, fluorine gas typified by $CF_4$, $SF_6$, $NF_3$, or the like, or $O_2$ may optionally be used as etching gases. In this embodiment, an ICP (Inductively Coupled Plasma) etching method is used, in which $CF_4$, and $Cl_2$ are used as the etching gases, and an RF (13.56 MHz) power of 500 W is applied to a coil type electrode under a pressure of 1 Pa to generate plasma. Thus the etching is performed. An RF (13.56 MHz) power of 20 W is also applied to the side of the substrate (sample stage) and a substantially negative self bias voltage is applied thereto. In the etching condition in which $CF_4$ and $Cl_2$ are mixed, both the W film and the TaN film are etched in the same degree. Note that, in order to perform the etching without leaving a residue on the gate insulating film, it is appropriated that an etching time is increased at a rate on the order of 10 to 20%.

By the above first etching process, end portions of the first conductive layer and the second conductive layer become the tapered shape by the effect of the bias voltage applied to the substrate side. The angle of the taper portion becomes 15 to 45°. In this way, first shape conductive layers 608 to 613 (first conductive layers 608a to 613a and second conductive layers 608b to 613b) are formed by etching the W film and the TaN film. Reference numeral 614 denotes a gate insulating film, and regions which are not covered with the first shape conductive layers 608 to 613 are etched by about 20 to 50 nm so that thinned regions are formed. (FIG. 14B)

Next, a second etching process is performed without removing the masks 601 to 607 consisting of resist. $CF_4$, $Cl_2$, and $O_2$ are used as the etching gases, and an RF power (13.56 MHz) of 500 W is applied to a coil type electrode under a pressure of 1 Pa to generate plasma. Thus, the etching is performed. An RF (13.56 MHz) power of 20 W is applied to the side of the substrate (sample stage) and a low self bias voltage as compared with the first etching process is applied thereto. Under this condition, the W film is etched.

By the above second etching process, the W film is anisotropically etched, and the TaN film which is a first conductive layer is etched at an etching rate lower than the W film to form second shape conductive layers 615 to 620 (first conductive layers 615a to 620a and second conductive layers 615b to 620b). Reference numeral 621 designates a gate insulating film, and regions which are not covered with the second shape conductive layers 615 to 620 are etched to become thinner.

Then, a first doping process is performed. Doping may be performed by ion doping or ion implanting. In this case, an impurity element imparting an n-type is doped at a high acceleration voltage. As the impurity element imparting the n-type, an element belonging to group 15, typically phosphorus (P) or arsenic (As) may be used, but phosphorus is used here. For example, an acceleration voltage is set as 70 to 120 keV, and impurity regions (A) 622 to 626 are formed. (FIG. 14C) The doping is performed in such a manner that the second shape conductive layers 615b to 619b are used as the masks to the impurity element, and the impurity element is added also to the semiconductor layer under the tapered shape portion of the second conductive layers 615a to 619a. Among the impurity regions (A) 622 to 626 thus formed in a self aligning manner, impurity regions overlapping with the conductive layers 615 to 619 are 622a, 623a, 624a, 625a, and 626a, and impurity regions not overlapping with the conductive layers 615 to 619 are 622b, 623b, 624b, 625b, and 626b.

Succeedingly, after removing the masks consisting of resist, the gate insulating film 621 is selectively removed using the conductive layers 615 to 619 as the masks to form insulating layers 627a, 627b and 627c. Further, at the same time with the formation of the insulating layers 627a, 627b and 627c, the resist masks, which have been used upon the formation of the second shape conductive layers 615 to 619, may be removed. (FIG. 14D).

Figures 15A, 15B, 15C:
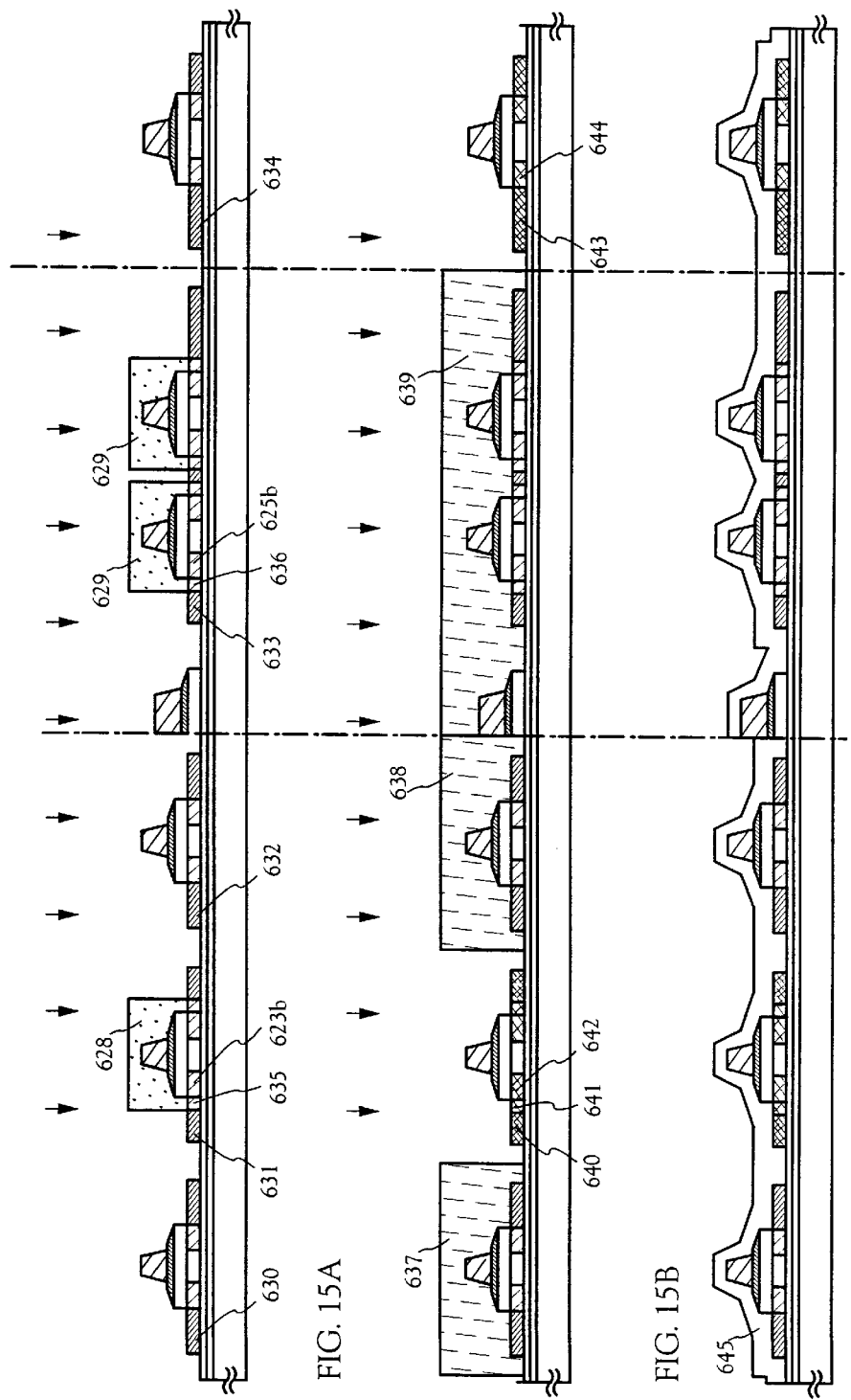
FIGS. 15A to 15C show a manufacturing process of the AM-LCD of Embodiment 6.
Figure 16:
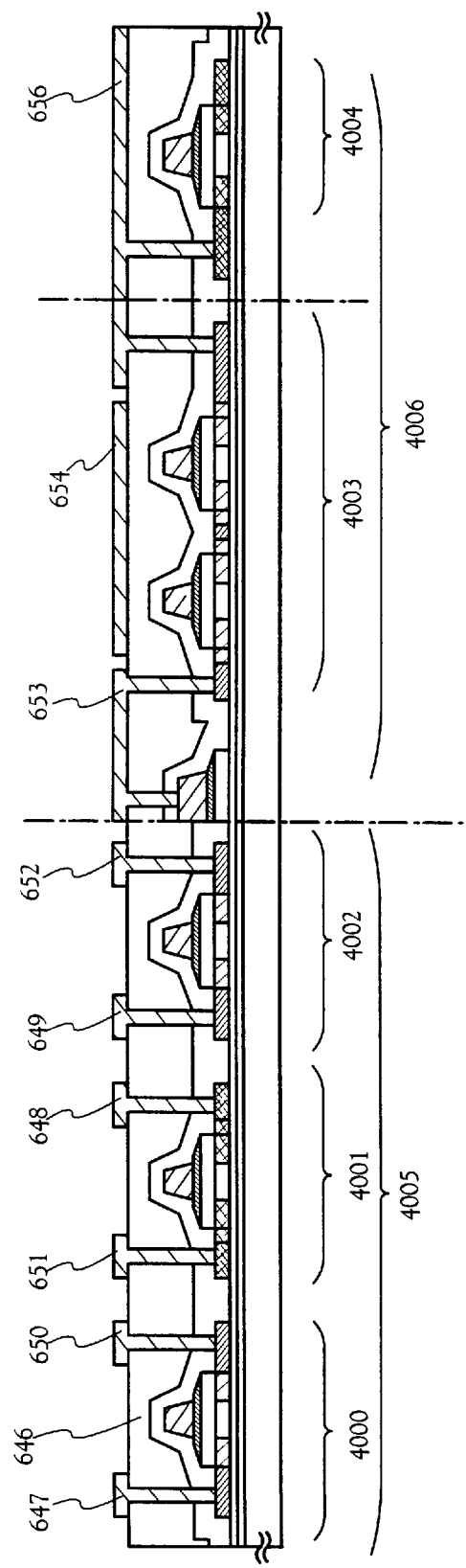
FIG. 16 shows a manufacturing process of the AM-LCD of Embodiment 6.

Subsequently, masks 628 and 628 consisting of resist are formed by using a photolithography method, and thereafter a second doping process is performed. In this case, dosage is increased compared with that of the first doping process, and an impurity element imparting an n-type is doped into a semiconductor layer at a low accelerating voltage. An impurity element imparting the n-type is added to impurity regions (B) 630 to 634 within a concentration range of $1\times10^{20}$ to $1\times10^{21}$ atoms/cm$^3$. (FIG. 15A)

Thus, the impurity regions (B) 630, 632, and 633, which become a source region or a drain region of n-channel type TFT can be formed. Besides, in the pixel portion, between the impurity region 633 and the impurity region (A) 625b overlapping with the conductive layer 618, a region 636 not overlapping with the conductive layer 618 is formed. The region 636 acts as an LDD region of the n-channel type TFT. Further, an impurity element, which is added to the impurity regions (B) 631 and 634, is to mainly reduce the nickel concentration in the semiconductor layer that consists a channel forming region in the later gettering process.

Then, similar to Embodiment 3, after removing the masks 628 and 629 consisting of resist, newly masks 637 to 639 consisting of resist are formed, and a third doping process is performed. (FIG. 15B) With this third doping process, impurity regions (C) 640 to 644 in which an impurity element imparting a conductivity opposite to the one conductivity type, are formed in the semiconductor layer that becomes an active layer of p-channel TFT. The second conductive layers 616 and 619 are used as the masks with respect to the impurity elements, and an impurity imparting a p-type is added to form the impurity regions (C) in a self aligning manner. In this embodiment, the impurity regions (C) 640 to 644 are formed by ion doping using diborane ($B_2H_6$). Further, similar to Embodiment 3, the impurity regions (C) 640 to 644 are doped with phosphorus in different concentrations, respectively. However, doping is performed so that the concentration of the impurity imparting p-channel in any of the regions falls within the range of $2\times10^{20}$ to $2\times10^{21}$ atoms/cm$^3$, with the result that the regions function as source and drain regions of the p-channel TFT, which causes no problem.

Subsequently, similar to Embodiment 3, the masks 637 to 639 consisting of resist are removed, and a first interlayer insulating film 645 covering the whole surface is formed. This first interlayer insulating film 645 is formed from an insulating film containing silicon by plasma CVD or sputtering into a thickness of 100 to 200 nm.

Then, as shown in FIG. 15C, a step of activating the impurity elements added in the respective semiconductor layers. This step is carried out by thermal annealing using a furnace annealing oven. The thermal annealing may be performed in a nitrogen atmosphere at 400 to 700° C., typically 500 to 600° C. Note that, other than the thermal annealing method, a laser annealing method, or a rapid thermal annealing method (RTA method) can be applied thereto.

Note that, in this embodiment, at the same time with the above activation process, nickel used as the catalyst for crystallization is gettered to the impurity regions (B) 630 to 634 containing phosphorous at high concentration. As a result, nickel concentration of the semiconductor layer which becomes a channel forming region is mainly lowered. The TFT having a channel forming region thus formed is decreased in off current, and has high electric field mobility because of good crystallinity, thereby attaining satisfactory characteristics.

Further, an activation process may be performed before forming the first interlayer insulating film 635. However, in the case where a wiring material used for the conductive layers 615 to 619 is weak to heat, it is preferable that the activation process is performed after an interlayer insulating film (containing silicon as its main component, for example, silicon nitride oxide film) is formed to protect the wiring or the like as in the present embodiment.

By the steps up to this, the impurity regions are formed in the respective semiconductor layers. The second shape conductive layers 615 to 618 overlapping with the semiconductor layers function as gate electrodes. Besides, the layer 620 functions as a source wiring, and the layer 619 functions as a second electrode for forming a storage capacitor.

In addition, heat treatment at 300 to 550° C. for 1 to 12 hours is performed in an atmosphere containing hydrogen of 3 to 100% to perform a step of hydrogenating the semiconductor layers. This step is a step of terminating dangling bonds in the semiconductor layer by thermally excited hydrogen. As another means for hydrogenation, plasma hydrogenation (using hydrogen excited by plasma) may be carried out.

Besides, heat treatment (at 300 to 550° C. for 1 to 12 hours) may be performed using hydrogen contained in the interlayer insulating film formed from a silicon nitride film to perform the hydrogenation of the semiconductor layer. In this case, if the heat treatment is performed at 410° C. for 1 hour in a nitrogen atmosphere, the dangling bond in the semiconductor layer may be terminated due to oxygen contained in the interlayer insulating film.

Besides, in the case of using a laser annealing method as the activation process, it is preferred to irradiate laser light such as an excimer laser or a YAG laser after the hydrogenating process.

Next, a second interlayer insulating film 646 made of an organic insulating material is formed on the first interlayer insulating film 645. Then, a patterning is performed for forming a contact hole reaching the source wiring 134 and the contact holes reaching the respective impurity regions (B) 630, 632, 633, 640, and 643.

Then, in a driver circuit 4005, wirings 647 to 652 electrically connecting to the impurity region (B) or the impurity region (C), respectively, are formed. Note that these wirings are formed by patterning a lamination film of a Ti film with a film thickness of 50 nm and an alloy film (alloy film of Al and Ti) with a film thickness of 500 nm.

In a pixel portion 4006, a pixel electrode 656, a gate wiring 654, and a connection electrode 653 are formed. (FIG. 16) By this connection electrode 653, the source wiring 620 is electrically connected to a pixel TFT 4003. Also, the gate wiring 654 is electrically connected to the first electrode (second shape conductive layer 618). Besides, the pixel electrode 656 is electrically connected to the drain region of the pixel TFT 4003, and further connected to the semiconductor layer 643 which functions as one of electrodes forming a storage capacitor 4004.

In the manner as described above, the driving circuit 4005 including an n-channel TFT 4000, a p-channel TFT 4001, and a n-channel TFT 4002 and the pixel portion 4006 including the pixel TFT 4003 and a storage capacitor 4004 can be formed on the same substrate. In the present specification, such a substrate is called an active matrix substrate for convenience.

The semiconductor layer of an n-channel TFT 4000 of the driving circuit 4005 includes a channel forming region, an impurity region (A) 622b (GOLD region) overlapping with the second shape conductive layer 615 forming the gate electrode, the impurity region (B) 630 functioning as a source region or a drain region. Also, The semiconductor layer of p-channel TFT 4001 includes a channel forming region, an impurity region (C) 642 overlapping with the second shape conductive layer 616 forming the gate electrode, and the impurity region (C) 640 functioning as a source region or a drain region. Also, the semiconductor layer of the n-channel TFT 4002 includes a channel forming region, an impurity region (A) 624b (GOLD region) overlapping with the second shape conductive layer 617 forming the gate electrode, the impurity region (B) 632 (LDD region) functioning as a source region or a drain region.

The pixel TFT 4003 of the pixel portion 4006 includes a channel forming region, an impurity region (A) 625b (GOLD region) overlapping with the second shape conductive layer 618 forming the gate electrode, an impurity region 636 (LDD region) formed outside the gate electrode, and the impurity region (B) 633 functioning as a source region or a drain region. Besides, impurity elements imparting p-type are added to the respective semiconductor layers 643 and 644 functioning as one of electrodes of the storage capacitor 4004 at the same concentration with the impurity region (C). The storage capacitor 4004 is formed from the second electrode 619 and the semiconductor layers 643 and 644 using the insulating layer 627c (the same film with the gate insulating film) as a dielectric member.

Further, a liquid crystal display device can be obtained using the active matrix substrate manufactured in this embodiment in accordance with the process steps of Embodiment 4.

Note that, the present embodiment may be combined with any one of Embodiments 1 to 5.

Embodiment 7

In this embodiment, a description will be made of an example of forming a pixel electrode having unevenness on the surface thereof without increasing the number of manufacturing steps. Note that, hereinbelow, the description will be made of only part which is different from Embodiment 3, for the simplicity.

Figure 19:
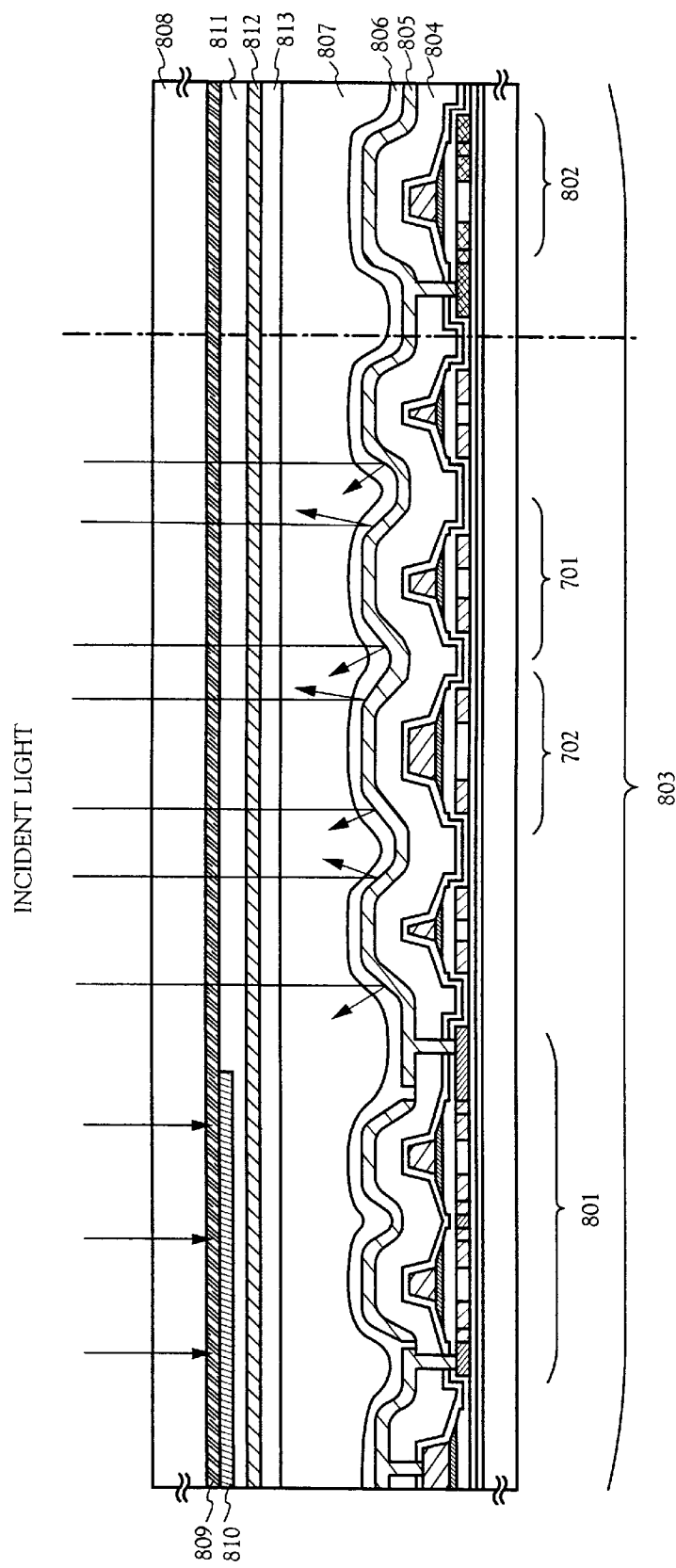
FIG. 19 is a sectional view showing the structure of an active matrix liquid crystal display device of Embodiment 7.

In Embodiment 3, in the region below the pixel electrode that becomes a display region, the base film 101, the insulating film 128, the first interlayer insulating film 159, and the second interlayer insulating film 160 are only laminated. However, in this embodiment, convex portions 701 and 702 shown in FIG. 19 are formed simultaneously with the formation of TFT, and the pixel electrode formed thereon is made uneven. This is a characteristic of this embodiment. Note that a pixel TFT 404 and a storage capacitor 405 shown in FIG. 8 and a pixel TFT 801 and a storage capacitor 802 shown in FIG. 19 are manufactured by an identical manufacturing method, respectively.

The convex portions 701 and 702 are formed simultaneously with the patterning of the semiconductor layer and a gate electrode as in the manufacturing step of the pixel TFT 404 shown in Embodiment 3. Note that the positions of the convex portions are not particularly limited as long as a region below the pixel electrode which becomes a display region of the pixel portion 803, and an area of the convex portion (area viewed from the top) is also not particularly limited. However, it is preferred that the area is within a range of 1 to 400 $\mu m^2$, preferably 25 to 100 $\mu m^2$. Note that, as random as the sizes of the convex portions are, the more reflection light can be scattered, which is preferable.

Figure 17A:
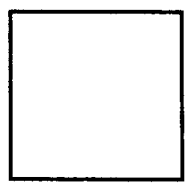
FIGS. 17A to 17G show top shapes of convex portions of Embodiment 7.
Figure 17B:
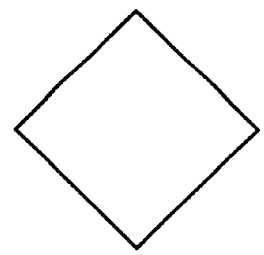
Figure 17C:
Figure 17D:
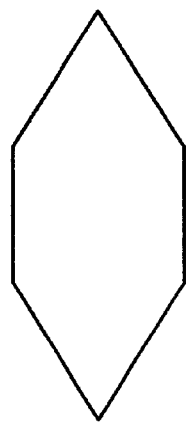
Figure 17E:
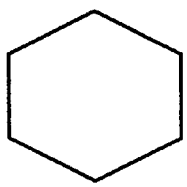
Figure 17F:
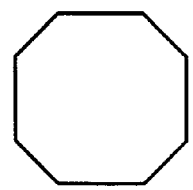
Figure 17G:
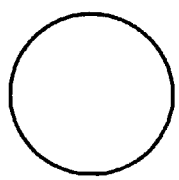

In this manner, without increasing the number of masks, the convex portions 701 and 702 can be formed by changing the mask. In this embodiment, the mask used in Embodiment 3 is changed, and two kinds of convex portions 701 and 702 having a quadrangle shape shown in FIG. 17A are formed in the display portion. In addition, the positions thereof are made random.

Figure 18:
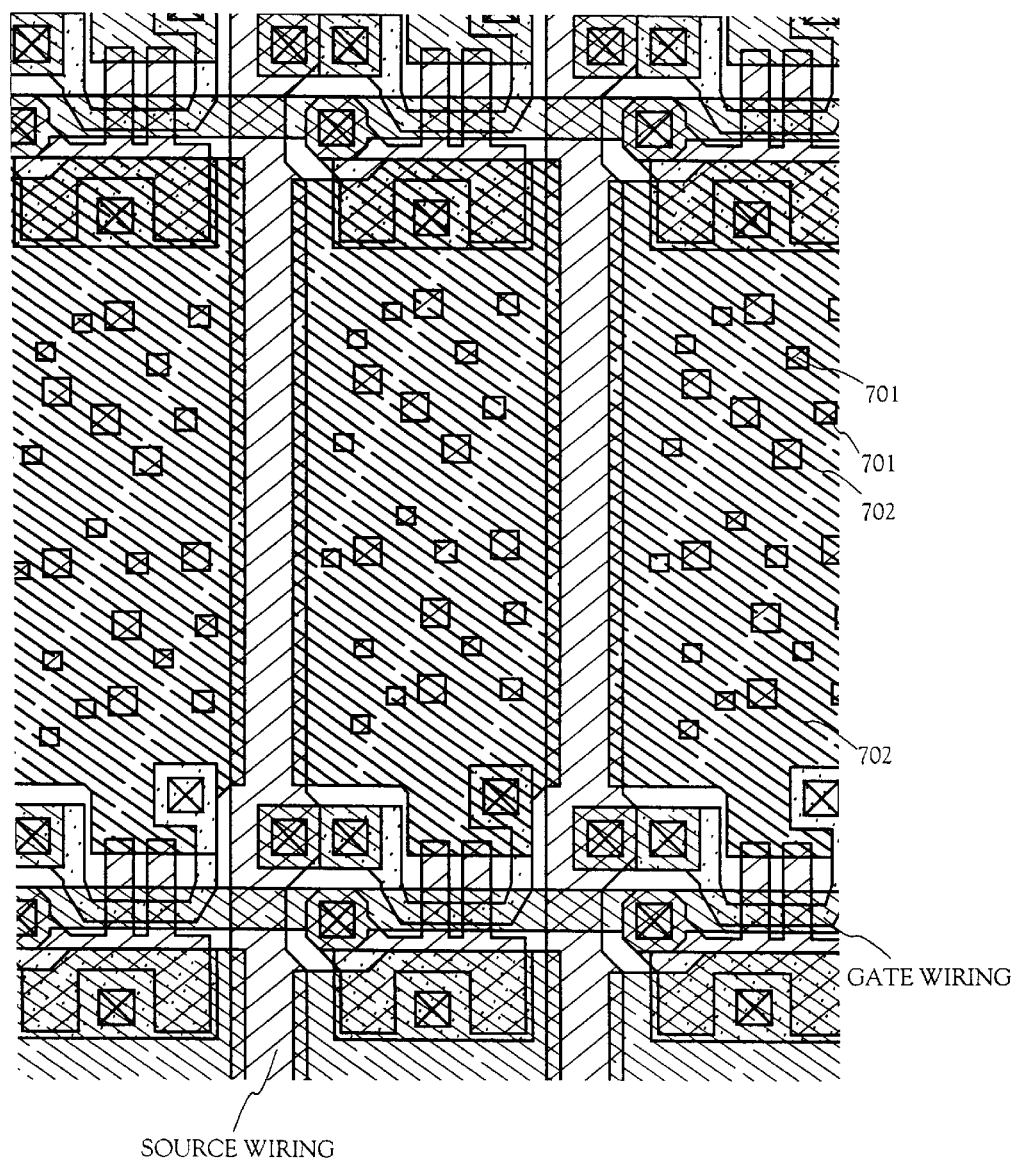
FIG. 18 is a diagram showing a top view of the pixel of Embodiment 7.

Note that, in FIG. 18, the quadrangle shape is shown, but the shape thereof is not particularly limited. The cross-section in a radial direction may be polygonal or a shape of non-symmetrical. For example, among the shapes shown in FIGS. 17A to 17G, any type may be selected. In addition, the convex portions may be arranged regularly or irregularly.

On the surface of an insulating film 804 that covers the convex portions 701 and 702 thus formed, unevenness is formed, with the result that a pixel electrode formed thereon is made uneven. The height of the convex portion of the pixel electrode 805 is 0.3 to 3 $\mu m$, preferably 0.5 to 1.5 $\mu m$. By the effect of the unevenness formed on the pixel electrode 805, as shown in FIG. 19, light can be scattered upon reflecting incident light.

Note that an inorganic insulating film or an organic resin film may be used as the insulating film 804. Depending on the material of the insulating film 804, the curvature of unevenness of the pixel electrode can be adjusted. Besides, in the case that an organic resin film is used as the insulating film 804, the organic resin film having a viscosity of 10 to 1000 cp, preferably 40 to 200 cp, is used so that unevenness is formed on the surface of the film by sufficiently receiving an influence of the convex portions 701 and 702. However, if the solvent which hardly evaporates is used, even if the viscosity of the organic resin film is low, the unevenness can be formed.

Then, in this embodiment, an orientation film 806 for covering the pixel electrode is formed, and is subjected to a rubbing process.

Subsequently, the opposing substrate shown in Embodiment 1 is prepared. In FIG. 19, reference numeral 808 denotes the opposing substrate, and colored layers 809, 810 and a planarization film 811 are formed on the opposing substrate 808 in accordance with Embodiment 1. The red-colored layer 809 and the blue-colored layer 810 are partially overlapped with each other to form a second light shielding portion. Note that, although not shown in FIG. 19, a first light shielding portion is formed by partially laminating the red-colored layer and the green-colored layer.

Then, an opposing electrode 812 is formed in the pixel portion, and an orientation film 813 is formed on an entire surface of the substrate, and is subjected to a rubbing process.

Further, an active matrix substrate, on which a pixel portion and a driver circuit are formed, and an opposing substrate are stuck by a sealing agent. In the sealing agent, filler is mixed, and the two substrates are stuck with each other while keeping a uniform gap by the effect of this filler and the columnar spacer. Thereafter, a liquid crystal material 807 is injected between both substrates to encapsulate the substrate completely by an encapsulant (not shown). A known liquid crystal material may be used as the liquid crystal material 807. Thus, the active matrix liquid crystal display device shown in FIG. 19 is competed.

Note that, the present embodiment may freely be combined with any one of the structures described in Embodiments 1 to 5.

Embodiment 8

In this embodiment, an example different from Embodiment 7, in which the pixel electrode having an unevenness on the surface thereof is formed, is described. Note that, for simplification, a description will be made of the points which are different from that in Embodiment 7, hereinbelow. Note that, in FIG. 20, the same reference numerals are used for the parts that correspond to FIG. 19.

Figure 20:
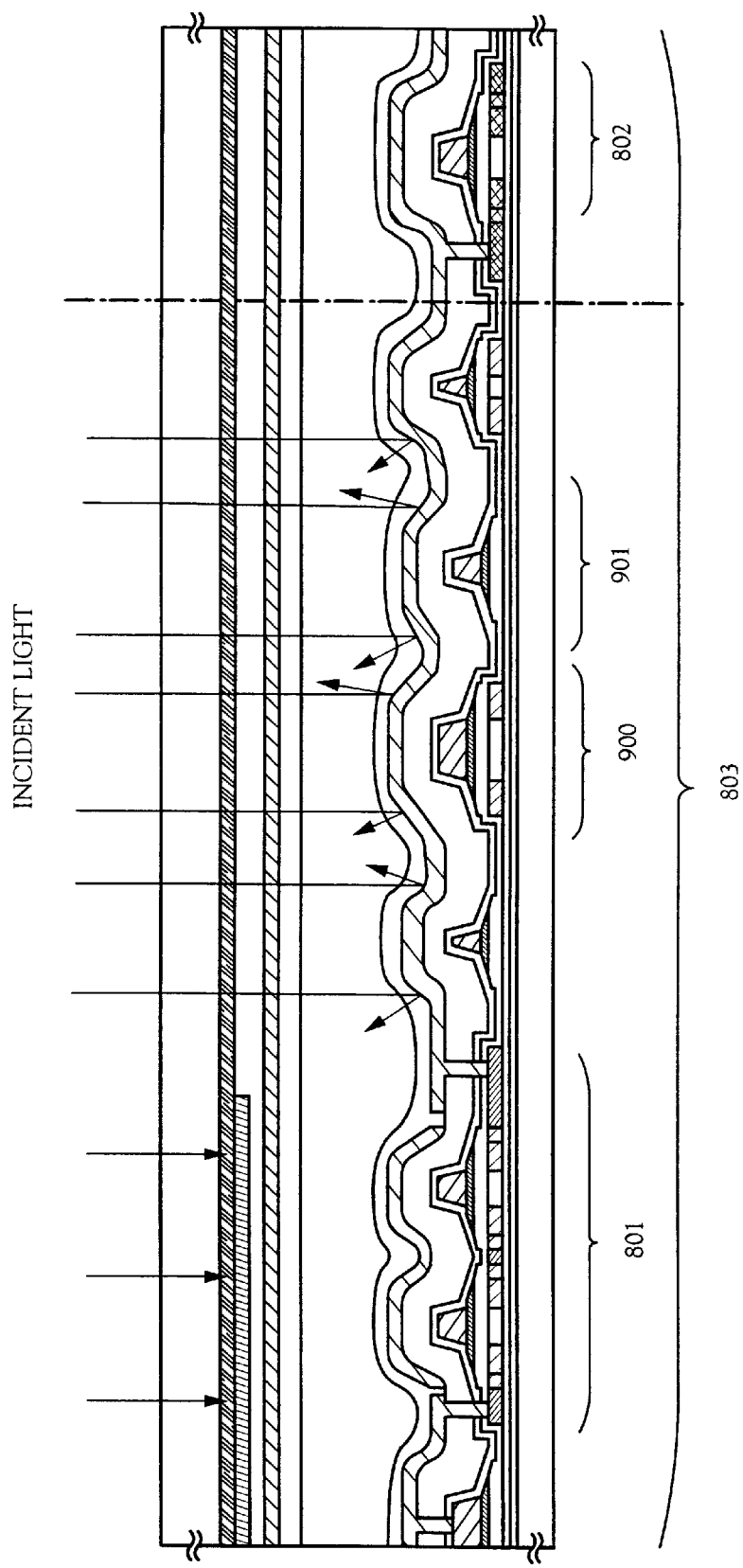
FIG. 20 is a sectional view showing the structure of the active matrix liquid crystal display device of Embodiment 8.

In this example, as shown in FIG. 20, convex portions 900 and 901 having different heights are formed.

The convex portions 900 and 901 can be formed by changing the mask used in Embodiment 7 without increasing the number of the masks. In FIG. 20, upon patterning the semiconductor, the mask not forming a semiconductor layer is used at the convex portion 901. As a result, the height of the convex portion 901 becomes lower than that of the convex portion 900 by a thickness of the semiconductor layer. In this embodiment, the mask which has been used for patterning of the semiconductor layer in Embodiment 7 is changed, and two kinds of quadrangle shapes of the convex portions 900 and 901 are formed at a portion the becomes a display region.

By taking this measure, the difference of levels of the unevenness formed on the surface of the pixel electrode may be enlarged without increasing the number of manufacturing steps, thereby being capable of further scattering reflection light.

Note that the present embodiment can freely be combined with any one of the structures described in Embodiments 1 to 5.

Embodiment 9

In Embodiments 7 and 8, there is shown a manufacturing example of a pixel electrode in which a convex portion which is formed simultaneously with a formation of a top gate type TFT is used. However, in this embodiment, there is shown a manufacturing example of a pixel electrode in which a convex portion which is formed simultaneously with a formation of an inverted stagger type TFT is used.

First, a gate wiring 1000 is formed using a first mask (first photo mask). At this time, a metallic layer 1001 made of the same material with the gate wiring is formed in a region that becomes a display region.

Next, an insulating film 1002 (gate insulating film), a first amorphous semiconductor film, a second amorphous semiconductor film containing an impurity element imparting an n-type, and a first conductive film are formed into a lamination in the stated order, while covering the gate wiring 1000 and the metallic film 1001. Note that a micro crystal semiconductor film may be used in place of the amorphous semiconductor film, and also the micro crystal semiconductor containing an impurity element imparting the n-type may be used in place of the amorphous semiconductor film containing an impurity element imparting the n-type. In addition, these films can be formed continuously by sputtering or plasma CVD, within a plurality of chambers or within the same chamber, without exposing them to atmosphere. By preventing them from exposing to atmosphere, the mixing of impurities can be prevented from occurring.

Figure 21:
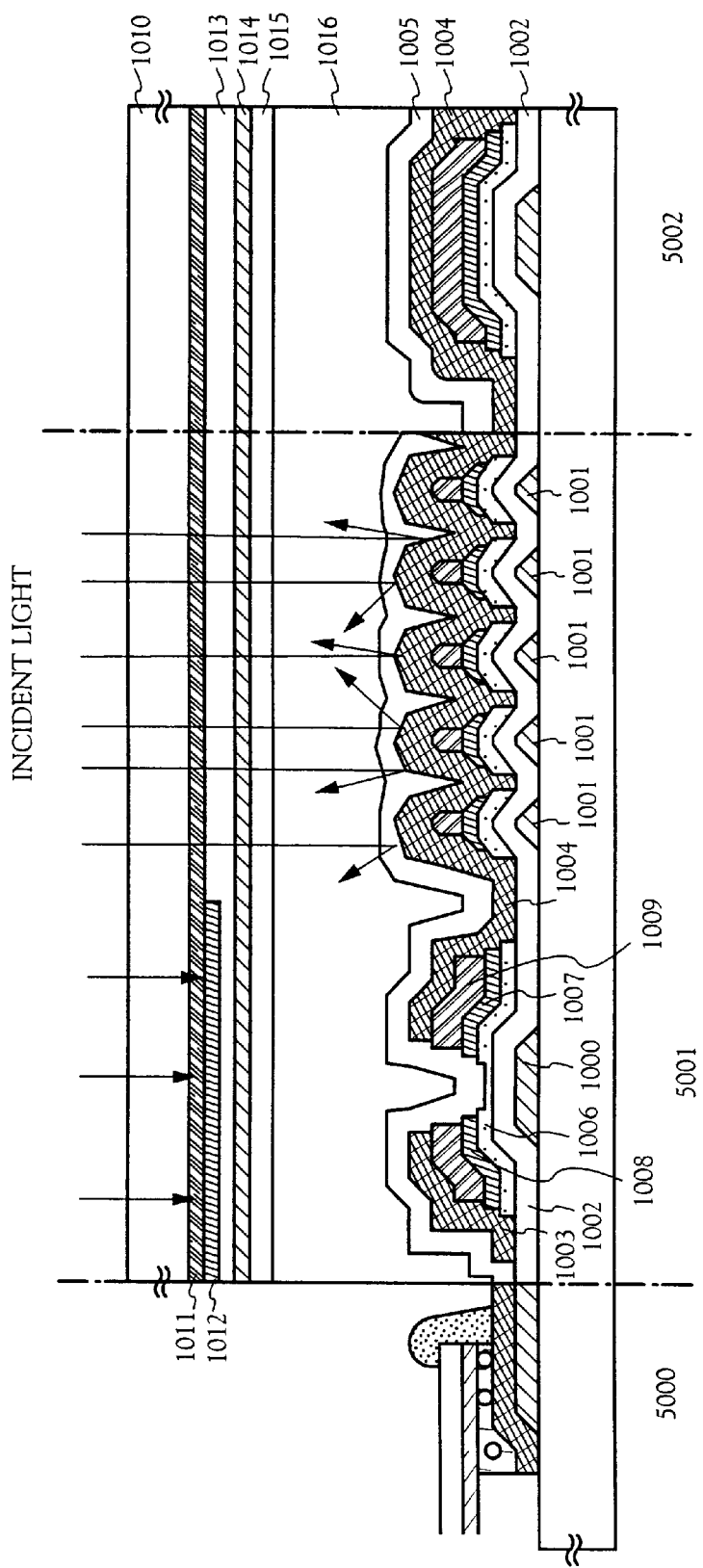
FIG. 21 is a sectional view showing the structure of the active matrix liquid crystal display device of Embodiment 9.

Then, wirings (become a source wiring and an electrode (drain electrode) later) made from the first conductive film is formed by patterning the first conductive film using a second mask (second photo mask), the second amorphous semiconductor film containing an impurity imparting an n-type is formed by patterning the second amorphous semiconductor film, and the first amorphous semiconductor film by patterning the first amorphous semiconductor film. Besides, a patterning is similarly performed onto the metallic layer 1001 so that the first amorphous semiconductor film, the second amorphous semiconductor film containing an impurity imparting the n-type, and the first conductive film are left. In this patterning, to enable the formation of an excellent coverage of the second conductive film which will be formed later, etching is performed so that the end portion becomes a step-like shape as shown in FIG. 21.

Besides, the shape of the metallic layers and the laminated products (convex portion) formed thereon are not particularly limited, the cross-sections in a radial direction may be a polygon or an asymmetric shape. For example, any one can be selected from the shapes shown in FIGS. 17A to 17G. Also, the metallic layers 1001 and the laminated products (convex portion) formed thereon may be arranged regularly or irregularly. In addition, the heights of the metallic layers 1001 and the laminated products (convex portion) formed thereon is 0.3 to 3 μm, preferably 0.5 to 1.5 μm.

Then, a resist mask is formed using a shadow mask at a terminal portion, and after selectively removing the insulating film 1002 covering a pad portion of the terminal portion, the resist mask is removed. The resist mask may also be formed by screen printing in place of the shadow mask so as to serve as an etching mask.

Thereafter, the second conductive film is formed on the entire surface. Note that a conductive film having reflection property, for example, a material consisting of Al or Ag is used as the second insulating film.

Then, the second conductive film is subjected to patterning using a third mask (third photo mask), and the pixel electrode 1004 made from the second conductive film is formed. The above-mentioned conductive films are subjected to patterning, and a source wiring 1003 and an electrode (drain electrode) 1009 are formed. The second amorphous semiconductor film containing an impurity element imparting an n-type is subjected to patterning, and a source region 1008 and the drain region 1009 made from the second amorphous semiconductor film containing an impurity element imparting the n-type are formed. A part of the first amorphous semiconductor film described above is removed to form a first amorphous semiconductor film 1006.

Then, an orientation film 1005 is formed, and is subjected to a rubbing process.

As such the configuration, when a pixel TFT portion 5001 is formed, it is possible to use three photomasks in photolithography technics.

With taking such a structure, an unevenness is formed by the insulating film formed on the metallic layer 1001, the first amorphous semiconductor film, the amorphous semiconductor film containing an impurity element imparting an n-type, and the laminated product made from the first conductive film, and the pixel electrode 1004 is formed while covering the unevenness. As a result, without increasing the number of the manufacturing steps, the surface of the pixel electrode 1004 is allowed to have the unevenness to thereby enable the scattering of light.

Subsequently, an opposing substrate shown in Embodiment 1 is prepared. In FIG. 21, reference numeral 1010 denotes an opposing substrate, and colored layers 1011, 1012 and a leveling film 1013 are formed on the opposing substrate 1010 in accordance with Embodiment 1. The red-colored layer 1011 and the blue-colored layer 1012 are partially overlapped with each other, to form a second light shielding portion. Note that, although not shown in FIG. 21, a first light shielding portion is formed by partially overlapping the red-colored layer and a green-colored layer with each other.

Then, an opposing electrode 1014 is formed in a pixel portion, and an orientation film 1015 is formed on the entire surface of the opposing substrate. The orientation film 1005 is then subjected to a rubbing process.

Besides, an active matrix substrate on which the pixel portion and a driver circuit are formed and the opposing substrate are stuck by a sealing agent. Filler is mixed into the sealing agent, and two substrates are stuck with each other by this filler and a columnar spacer while keeping a uniform gap. Thereafter, a liquid crystal material 1016 is injected between both substrates, and is completely encapsulated by an encapsulant (not shown). A known liquid crystal material may be used for the liquid crystal material 1016. In this manner, the active matrix liquid crystal display device shown in FIG. 21 is completed.

Figure 22:
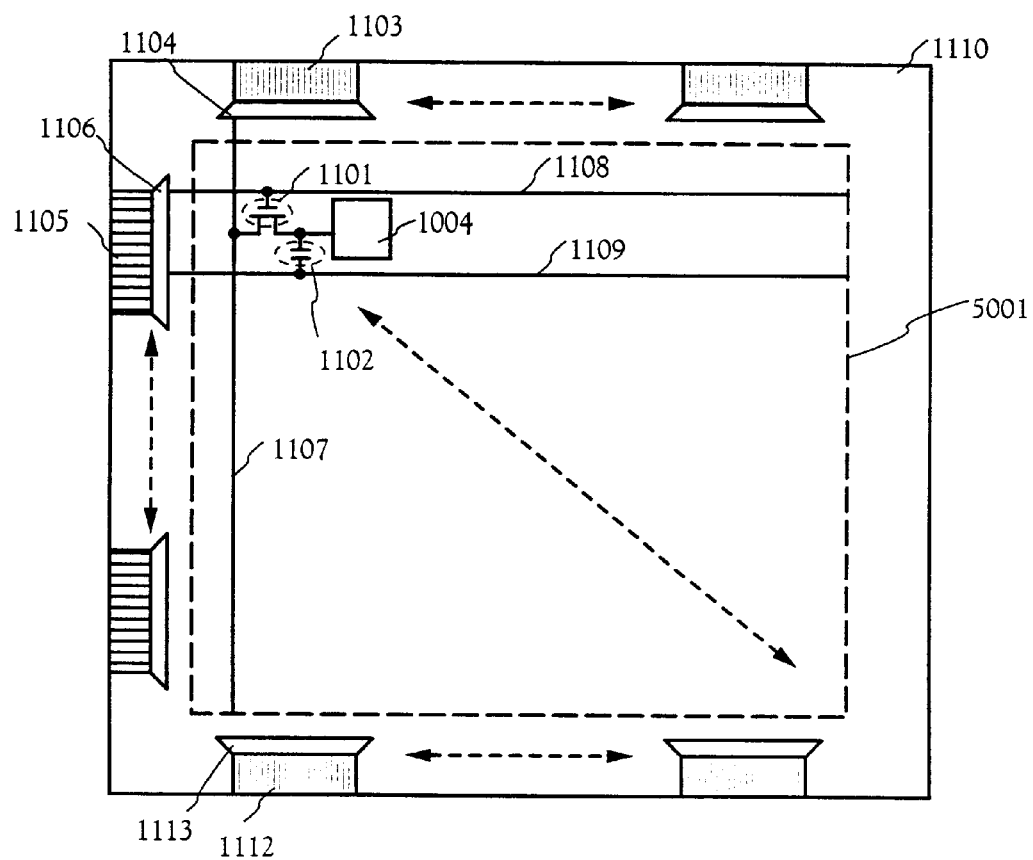
FIG. 22 shows an arrangement of a pixel portion and terminal portions of an active matrix substrate of Embodiment 9.

FIG. 22 is a drawing illustrating arrangements of a pixel TFT portion 5001 and a terminal portion 5000 formed on the active matrix substrate. Formed on a substrate 1110 is a pixel TFT portion 5001, and a gate wiring 1108 and a source wiring 1107 are formed so as to intersect with each other. An n-channel TFT 1101 for connecting to those wirings is provided so as to correspond to each pixel. On the drain side of the n-channel TFT, the pixel electrode 1004 and a storage capacitor 1102 are connected, and the other terminal of the storage capacitor 1102 is connected to a capacitor wiring 1109. The structures of the n-channel TFT 1101 and the storage capacitor 1102 are the same as the n-channel TFT or the storage capacitor shown in FIG. 21.

An input terminal portion 1105 for inputting a scanning signal is formed on one end of the substrate, and is connected to the gate wiring 1108 through a connection wiring 1106. Besides, an input terminal 1103 for inputting an image signal is formed on the other end portion, and is connected to the source wiring 1107 through a connection wiring 1104. With respect to the gate wiring 1108, the source wiring 1107, and the capacitor wiring 1109, the plural number of the wirings are provided in accordance with a pixel density. Further, an input terminal 1112 for inputting an image signal and a connection wiring 1113 may be provided so as to connect with the source wiring alternately by the input terminal 1103. An arbitrary number of the input terminals 1103, 1105, and 1112 may be formed, and an operator may appropriately determine the number thereof.

Note that the present embodiment may be combined with Embodiment 1 or Embodiment 2.

Embodiment 10

In this embodiment, an example is shown in which a pixel electrode having an unevenness on its surface is manufactured without increasing the number of the manufacturing steps. Note that, for simplification, a description will be made of only points different from Embodiment 9, hereinbelow. Note that parts corresponding to FIG. 21 are represented by the same reference numerals.

Figure 23:
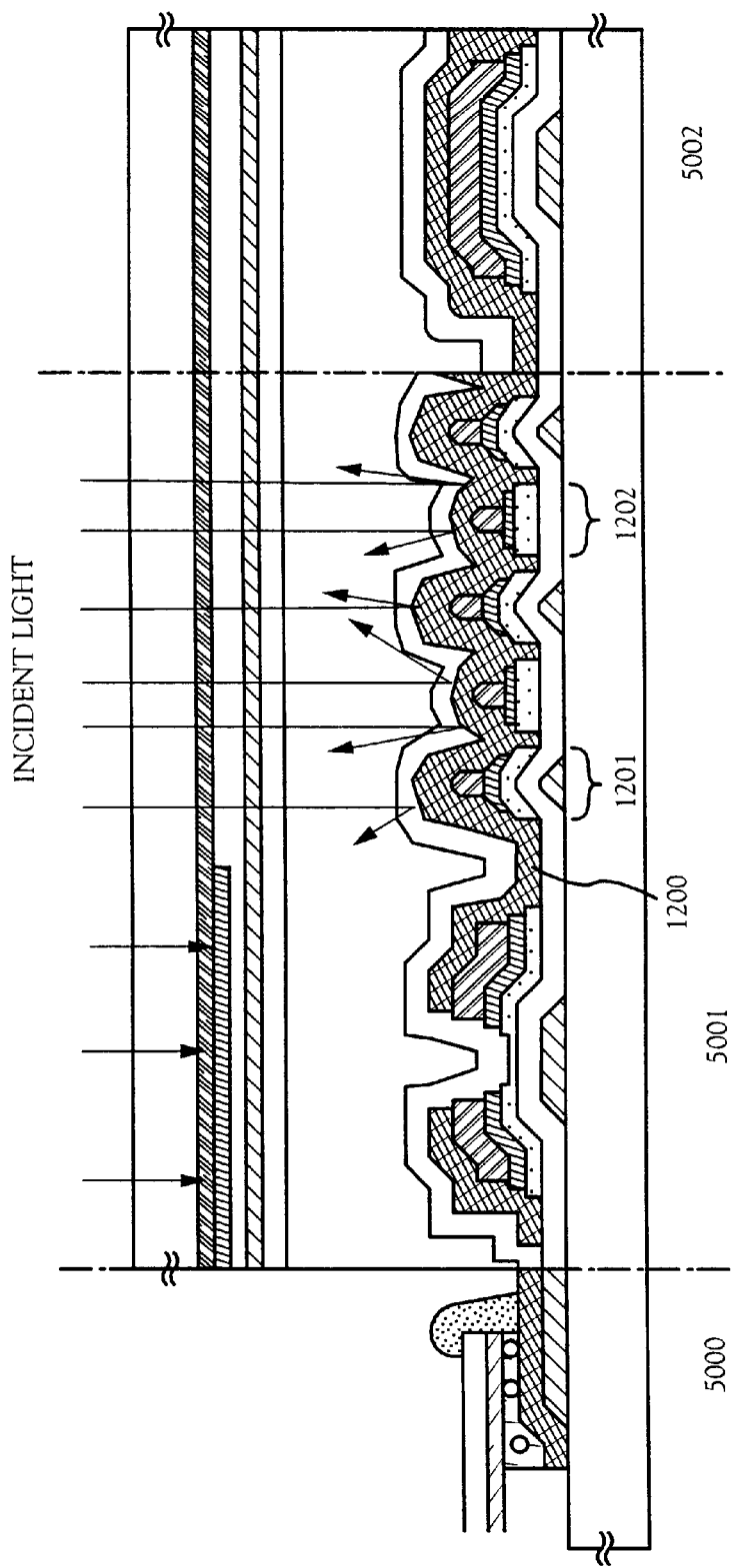
FIG. 23 is a sectional view showing the structure of the active matrix liquid crystal display device of Embodiment 10.

As shown in FIG. 23, this embodiment is an example in which convex portions 1201 and 1202 having different heights are formed.

The convex portions 1201 and 1202 may be formed by changing the mask used in Embodiment 9 without increasing the number of masks. In FIG. 23, upon performing the patterning of a gate electrode, a mask not forming a metallic layer is used at the convex portion 1202, and therefore the height of the convex portion 1202 becomes lower than that of the convex portion 1201 by a thickness of the metallic layer. In this embodiment, the mask used for the patterning of the metallic layer in Embodiment 9 is changed, and the convex portions 1201 and 1202 having different heights are formed at random in a portion that becomes a display region.

By taking such a structure, the difference of the level of the convex portions formed on the surface of a pixel electrode can be enlarged, thereby being capable of scattering the reflection light.

Note that the present embodiment may be combined with Embodiment 1 and Embodiment 2.

Embodiment 11

A TFT formed by implementing any one of respective embodiments 1 to 10 mentioned above is utilized for various electro-optical devices (active matrix liquid crystal display, active matrix EC display). Namely, the present invention can be applied to electronic apparatuses incorporating the electro-optical device in its display portion.

The following can be given as examples of such electronic equipments: a video camera; a digital camera; a projector (rear type or front type); a head mounted display (a goggle type display); a car navigation system; a car audio system; a personal computer; a portable information terminal (such as a mobile computer, a mobile telephone, or an electronic book). Examples of those electronic apparatuses are shown in FIGS. 26A–26F and 27A–27C.

FIG. 26A illustrates a personal computer which includes a main body 2001, an image input portion 2002, a display portion 2003, a key board 2004, or the like. The present invention can be applied to the display portion 2003.

FIG. 26B illustrates a video camera which includes a main body 2101, a display portion 2102, an audio input portion 2103, operation switches 2104, a battery 2105, an image receiving portion 2106, or the like. The present invention can be applied to the display portion 2102.

FIG. 26C is a mobile computer which includes a main body 2201, a camera section 2202, an image receiving section 2203, operation switches 2204, a display portion 2205, or the like. The present invention can be applied to the display portion 2205.

FIG. 26D is a goggle type display which includes a main body 2301, a display portion 2302, and an arm section 2303. The present invention can be applied to the display portion 2302.

FIG. 26E is a player using a recording medium which records a program (hereinafter referred to as a recording medium) and includes a main body 2401, a display portion 2402, a speaker section 2403, a recording medium 2404, and operation switches 2405. This device uses DVD (digital versatile disc), CD, etc. for the recording medium, and can be used for music appreciation, film appreciation, games and Internet. The present invention can be applied to the display portion 2402.

FIG. 26F is a digital camera which includes a main body 2501, a display portion 2502, a view finder 2503, operation switches 2504, and an image receiving section (not shown in the figure). The present invention can be applied to the display portion 2502.

Figure 27A:
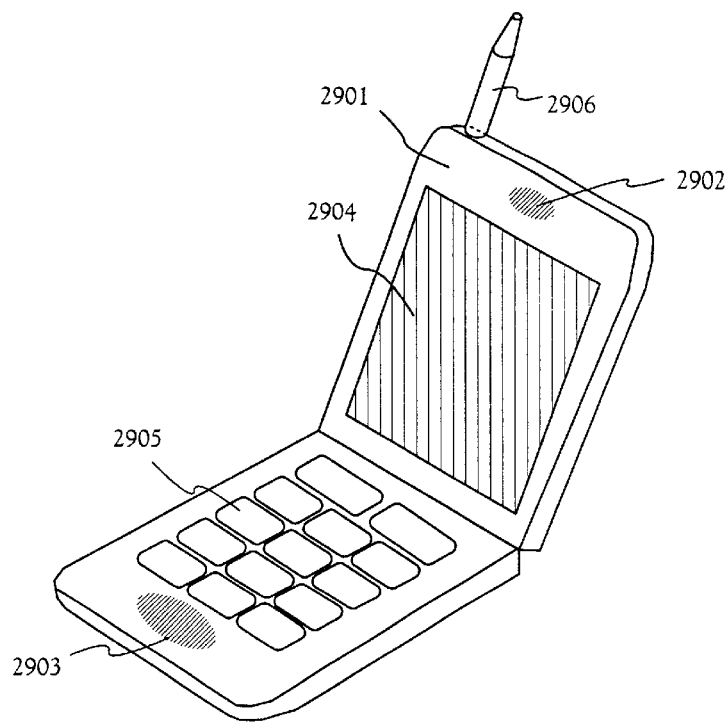
FIGS. 27A to 27C show examples of electronic apparatus of Embodiment 11.

FIG. 27A is a portable telephone which includes a main body 2901, a voice output portion 2902, a voice input portion 2903, a display portion 2904, operation switches 2905, and an antenna 2906. The present invention can be applied to the display portion 2904.

Figure 27B:
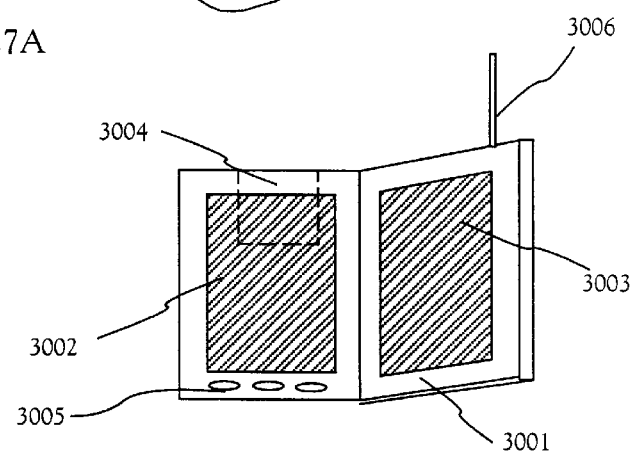

FIG. 27B is a portable electronic book which includes a main body 3001, display portions 3002 and 3003, a memory medium 3004, an operation switch 3005 and an antenna 3006. The present invention can be applied to the display portions 3002 and 3003.

Figure 27C:
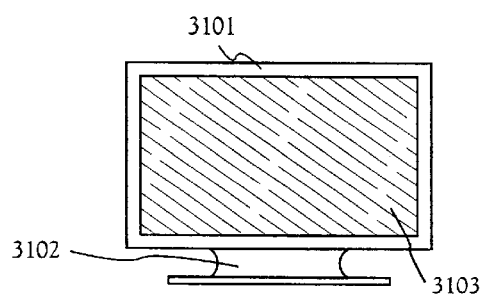

FIG. 27C is a display which includes a main body 3101, a support stand 3102, and a display portion 3103, etc. The present invention can be applied to the display portion 3103. The display of the present invention is advantageous for a large size screen in particular, such as a display equal to or greater than 10 inches (especially equal to or greater than 30 inches) in the opposite angle.

As mentioned above, the application range of the present invention is extremely wide, and the invention can be applied to electronic equipments in all fields. Further, any constitution of the electronic apparatuses shown in Embodiments 1 to 10 may be employed in Embodiment 11.

In the present invention, the light-shielding portion is formed from a lamination film consisting of two layers of the colored layers R+B or R+G. As a result, according to the present invention, a step of forming a black matrix can be omitted.

TABLE 1

REFLECTION RATIO OF A LAMINATION FILM
OF TWO COLORED LAYERS

| WAVE LENGTH | REFLECTION RATIO (COLOR RESIST FOR REFLECTION) | | |
|---|---|---|---|
| [nm] | R + B + Al | G + B + Al | R + G + Al |
| 400 | 30.0% | 14.5% | 11.3% |
| 450 | 27.9% | 12.8% | 7.8% |
| 500 | 6.0% | 56.2% | 6.0% |
| 550 | 6.1% | 24.1% | 9.3% |
| 600 | 9.5% | 6.6% | 36.9% |
| 650 | 13.5% | 5.5% | 12.8% |
| 700 | 18.2% | 8.1% | 25.3% |
| 750 | 15.1% | 8.6% | 33.2% |
| 800 | 62.5% | 35.4% | 51.8% |

MEASUREMENT CONDITION: D LIGHT SOURCE
VIEW FIELD ANGLE: 2 OBJECTIVE LENS × 5

What is claimed is:

1. An electro-optical device comprising:
   a first film composed of at least two colored layers;
   a second film composed of one colored material on the first film;
   a first light shielding portion including a first part of the first film and a first part of the second film; and
   a second light shielding portion including a second part of the first film and a second part of the second film,
   wherein the first part of the first film and the second part of the first film are composed of different colored materials.

2. The electro-optical device according to claim 1, wherein an amount of reflection light of the first light shielding portion and an amount of reflection light of the second light shielding portion are different from each other.

3. The electro-optical device according to claim 1, wherein the second film is a red color.

4. The electro-optical device according to claim 1, wherein the first part of the first film is a blue color.

5. The electro-optical device according to claim 1, wherein the second part of the first film is a green color.

6. The electro-optical device according to claim 1, wherein the first light shielding portion and the second light shielding portion are formed on an opposing substrate.

7. The electro-optical device according to claim 1, wherein each of the first film and the second film comprises an organic photosensitive material.

8. The electro-optical device according to claim 1, wherein the electro-optical device is one selected from the group consisting of a personal computer, a video camera, a portable information terminal (such as a mobile computer, a mobile telephone, or an electronic book), a goggle type display, a digital camera, a player using a recording medium.

9. An electro-optical device comprising:
   at least a thin film transistor;
   a first film composed of at least two colored layers;
   a second film composed of one colored material on the first film;
   a first light shielding portion including a first part of the first film and a first part of the second film; and
   a second light shielding portion including a second part of the first film and a second part of the second film,
   wherein the first part of the first film and the second part of the first film are composed of different colored materials; and
   wherein the first light shielding portion is formed so as to overlap with a channel forming region of the thin film transistor.

10. The electro-optical device according to claim 9, wherein an amount of reflection light of the first light shielding portion and an amount of reflection light of the second light shielding portion are different from each other.

11. The electro-optical device according to claim 9, wherein the second film is a red color.

12. The electro-optical device according to claim 9, wherein the first part of the first film is a blue color.

13. The electro-optical device according to claim 9, wherein the second part of the first film is a green color.

14. The electro-optical device according to claim 9, wherein the first light shielding portion and the second light shielding portion are formed on an opposing substrate.

15. The electro-optical device according to claim 9, wherein each of the first film and the second film comprises an organic photosensitive material.

16. The electro-optical device according to claim 9, wherein the electro-optical device is one selected from the group consisting of a personal computer, a video camera, a portable information terminal (such as a mobile computer, a mobile telephone, or an electronic book), a goggle type display, a digital camera, a player using a recording medium.

17. An electro-optical device comprising:
   at least a thin film transistor on a first substrate;
   a first film composed of at least two colored layers over a second substrate;
   a second film composed of one colored material on the first film;
   a first light shielding portion including a first part of the first film and a first part of the second film; and
   a second light shielding portion including a second part of the first film and a second part of the second film, wherein the first part of the first film and the second part of the first film are composed of different colored materials; and wherein the first light shielding portion is formed so as to overlap with a channel forming region of the thin film transistor.

18. The electro-optical device according to claim 17, wherein an amount of reflection light of the first light shielding portion and an amount of reflection light of the second light shielding portion are different from each other.

19. The electro-optical device according to claim 17, wherein the second film is a red color.

20. The electro-optical device according to claim 17, wherein the first part of the first film is a blue color.

21. The electro-optical device according to claim 17, wherein the second part of the first film is a green color.

22. The electro-optical device according to claim 17, wherein each of the first film and the second film comprises an organic photosensitive material.

23. The electro-optical device according to claim 17, wherein the electro-optical device is one selected from the group consisting of a personal computer, a video camera, a portable information terminal (such as a mobile computer, a mobile telephone, or an electronic book), a goggle type display, a digital camera, a player using a recording medium.

24. An electro-optical device comprising:
a first film composed of at least two colored layers;
a second film composed of one colored material on the first film;
a first light shielding portion including a first part of the first film and a first part of the second film;
a second light shielding portion including a second part of the first film and a second part of the second film; and
a leveling film on the second film,
wherein the first part of the first film and the second part of the first film are composed of different colored materials.

25. The electro-optical device according to claim 24, wherein an amount of reflection light of the first light shielding portion and an amount of reflection light of the second light shielding portion are different from each other.

26. The electro-optical device according to claim 24, wherein the second film is a red color.

27. The electro-optical device according to claim 24, wherein the first part of the first film is a blue color.

28. The electro-optical device according to claim 24, wherein the second part of the first film is a green color.

29. The device according to claim 24, wherein the first light shielding portion and the second light shielding portion are formed on an opposing substrate.

30. The electro-optical device according to claim 24, wherein each of the first film and the second film comprises an organic photosensitive material.

31. The electro-optical device according to claim 24, wherein the electro-optical device is one selected from the group consisting of a personal computer, a video camera, a portable information terminal (such as a mobile computer, a mobile telephone, or an electronic book), a goggle type display, a digital camera, a player using a recording medium.

32. An electro-optical device comprising:
at least a thin film transistor;
a first film composed of at least two colored layers;
a second film composed of one colored material on the first film;
a first light shielding portion including a first part of the first film and a first part of the second film;
a second light shielding portion including a second part of the first film and a second part of the second film; and
a leveling film on the second film, wherein the first part of the first film and the second part of the first film are composed of different colored materials; and wherein the first light shielding portion is formed so as to overlap with a channel forming region of the thin film transistor.

33. The electro-optical device according to claim 32, wherein an amount of reflection light of the first light shielding portion and an amount of reflection light of the second light shielding portion are different from each other.

34. The electro-optical device according to claim 32, wherein the second film is a red color.

35. The electro-optical device according to claim 32, wherein the first part of the first film is a blue color.

36. The electro-optical device according to claim 32, wherein the second part of the first film is a green color.

37. The electro-optical device according to claim 32, wherein the first light shielding portion and the second light shielding portion are formed on an opposing substrate.

38. The electro-optical device according to claim 32, wherein each of the first film and the second film comprises an organic photosensitive material.

39. The electro-optical device according to claim 32, wherein the electro-optical device is one selected from the group consisting of a personal computer, a video camera, a portable information terminal (such as a mobile computer, a mobile telephone, or an electronic book), a goggle type display, a digital camera, a player using a recording medium.

40. An electro-optical device comprising:
a first film composed of at least two colored layers over a second substrate;
a second film composed of one colored material on the first film;
a first light shielding portion including a first part of the first film and a first part of the second film; and
a second light shielding portion including a second part of the first film and a second part of the second film; and
a leveling film on the second film, wherein the first part of the first film and the second part of the first film are composed of different colored materials; and wherein the first light shielding portion is formed so as to overlap with a channel forming region of the thin film transistor.

41. The electro-optical device according to claim 40, wherein an amount of reflection light of the first light shielding portion and an amount of reflection light of the second light shielding portion are different from each other.

42. The electro-optical device according to claim 40, wherein the second film is a red color.

43. The electro-optical device according to claim 40, wherein the first part of the first film is a blue color.

44. The electro-optical device according to claim 40, wherein the second part of the first film is a green color.

45. The electro-optical device according to claim 40, wherein each of the first film and the second film comprises an organic photosensitive material.

46. The electro-optical device according to claim 40, wherein the electro-optical device is one selected from the group consisting of a personal computer, a video camera, a portable information terminal (such as a mobile computer, a mobile telephone, or an electronic book), a goggle type display, a digital camera, a player using a recording medium.

* * * * *